US012795733B2

(12) United States Patent
Alfarhan et al.

(10) Patent No.: US 12,795,733 B2
(45) Date of Patent: Nov. 10, 2026

(54) MULTI-PREAMBLE PHYSICAL RANDOM ACCESS CHANNEL INDICATION

(71) Applicant: InterDigital Patent Holdings, Inc., Wilmington, DE (US)

(72) Inventors: Faris Alfarhan, Montreal (CA); Paul Marinier, Brossard (CA); Dylan Watts, Montreal (CA); Fumihiro Hasegawa, Westmount (CA); Keiichi Kubota, Tokyo (JP)

(73) Assignee: InterDigital Patent Holdings, Inc., Wilmington, DE (US)

( * ) Notice: Subject to any disclaimer, the term of this patent is extended or adjusted under 35 U.S.C. 154(b) by 300 days.

(21) Appl. No.: 18/294,649

(22) PCT Filed: Aug. 3, 2022

(86) PCT No.: PCT/US2022/039236
§ 371 (c)(1),
(2) Date: Feb. 2, 2024

(87) PCT Pub. No.: WO2023/014761
PCT Pub. Date: Feb. 9, 2023

(65) Prior Publication Data

US 2024/0381429 A1 Nov. 14, 2024

Related U.S. Application Data

(60) Provisional application No. 63/249,940, filed on Sep. 29, 2021, provisional application No. 63/228,903, filed on Aug. 3, 2021.

(51) Int. Cl.
*H04W 74/0833* (2024.01)
*H04W 76/27* (2018.01)

(52) U.S. Cl.
CPC ....... *H04W 74/0833* (2013.01); *H04W 76/27* (2018.02)

(58) Field of Classification Search
CPC . H04W 74/0833; H04W 76/27; H04W 74/08; H04W 74/004; H04W 74/006;
(Continued)

(56) References Cited

U.S. PATENT DOCUMENTS

| | | | | |
|---|---|---|---|---|
| 11,083,010 B2 * | 8/2021 | Pan | ........................ | H04L 5/0053 |
| 2020/0305201 A1 * | 9/2020 | Lei | ........................ | H04L 25/0226 |

(Continued)

FOREIGN PATENT DOCUMENTS

| | | |
|---|---|---|
| WO | 2020198671 A1 | 10/2020 |
| WO | 2021067784 A1 | 4/2021 |

OTHER PUBLICATIONS

3GPP TS 38.321 V15.12.0, "3rd Generation Partnership Project; Technical Specification Group Radio Access Network; NR; Medium Access Control (MAC) protocol specification (Release 15)", Mar. 2021, 79 pages.

*Primary Examiner* — Atique Ahmed
(74) *Attorney, Agent, or Firm* — Condo Roccia Koptiw LLP

(57) ABSTRACT

A wireless transmit/receive unit (WTRU) may receive configuration information that indicates associated random access channel occasions (ROs), for example, a first RO and a second RO. The WTRU may determine a feature combination associated with the WTRU. The WTRU may determine a set of preambles based on the feature combination associated with the WTRU. The set of preambles may include multiple subsets of preambles, for example, a first subset of preambles associated with the first RO of the associated ROs and a second subset of preambles associated with the second RO of the associated ROs. The WTRU may transmit a first preamble of the first subset of preambles on
(Continued)

the first RO of the plurality of associated ROs and a second preamble of the second subset of preambles on the second RO of the plurality of associated ROs.

20 Claims, 10 Drawing Sheets

(58) Field of Classification Search
CPC ... H04W 72/12; H04W 74/002; H04W 48/16; H04L 5/0053; H04L 5/0094
See application file for complete search history.

(56) References Cited

U.S. PATENT DOCUMENTS

| | | | | |
|---|---|---|---|---|
| 2020/0314913 | A1* | 10/2020 | Rastegardoost | H04L 5/0048 |
| 2021/0058971 | A1* | 2/2021 | MolavianJazi | H04L 1/08 |
| 2021/0219346 | A1* | 7/2021 | Agiwal | H04W 56/001 |
| 2022/0159741 | A1* | 5/2022 | Hoang | H04B 7/18513 |
| 2023/0038191 | A1* | 2/2023 | He | H04W 74/002 |
| 2023/0087902 | A1* | 3/2023 | Zheng | H04W 8/22 370/329 |
| 2023/0189342 | A1* | 6/2023 | Lin | H04W 74/006 370/329 |
| 2023/0199862 | A1* | 6/2023 | Li | H04W 52/08 370/329 |
| 2024/0032103 | A1* | 1/2024 | Rastegardoost | H04W 74/0833 |

* cited by examiner

100

FIG. 3
RO1
RO2
RO3
RO4
SSB1
SSB2
SSB3
SSB4
SSB5
SSB6
RO for 2nd Preamble tx
RO for 2nd Preamble tx
feature 1
feature 2
feature 3
feature 4
0
63
SSB1
SSB2
SSB3
Preambles to indicate feature combination

MULTI-PREAMBLE PHYSICAL RANDOM ACCESS CHANNEL INDICATION

CROSS-REFERENCE TO RELATED APPLICATIONS

This application is the National Stage Entry under 35 U.S.C. § 371 of Patent Cooperation Treaty Application No. PCT/US2022/039236, filed Aug. 3, 2022, which claims the benefit of U.S. Provisional Application Ser. No. 63/228,903, filed Aug. 3, 2021, and U.S. Provisional Application Ser. No. 63/249,940, filed Sep. 29, 2021, the contents of which are incorporated by reference herein.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are described herein for indicating a feature combination associated with a wireless transmit/receive unit (WTRU) by determining a set of preambles based on the feature combination associated with the WTRU.

A WTRU may receive configuration information that indicates random access channel occasions (ROs), for example, a first RO and a second RO. The ROs may be associated, and the configuration information may indicate the association of the ROs. The WTRU may be associated with a feature combination. The WTRU may determine the feature combination associated with the WTRU. The WTRU may determine a set of preambles based on the feature combination associated with the WTRU. The set of preambles may include multiple subsets of preambles, for example, a first subset of preambles and a second subset of preambles. The first subset of preambles may be associated with the first RO of the associated ROs. The second subset of preambles may be associated with the second RO of the associated ROs. The WTRU, for example, to indicate the feature combination associated with the WTRU to a network, may transmit a first preamble of the first subset of preambles on the first RO of the associated ROs and a second preamble of the second subset of preambles on the second RO of the associated ROs.

The WTRU may indicate the feature combination and/or information associated with the feature combination by transmitting the first preamble on the first RO and a second preamble on the second RO. For example, the first preamble transmitted on the first RO may indicate the feature combination, and the second preamble transmitted on the second RO may indicate additional information associated with the feature combination. The additional information associated with the feature combination may indicate one or more of: a feature of the feature combination, a distinction among features of the feature combination, or a randomized preamble selection by WTRUs that select the feature combination.

The feature combination associated with the WTRU may include one or more features. For example, a feature of the one or more features may be indicated by a combination of the first preamble and the second preamble. In some examples, each of the first preamble and the second preamble may indicate the feature.

The configuration information that indicates the associated ROs may indicate one or more of an association of the set of preambles with the feature combination, an association of the first subset of preambles with the first RO, or an association of the second subset of preambles with the second RO. The WTRU may determine the set of preambles based on the configuration information that indicates the association of the set of preambles with the feature combination and based on the feature combination associated with the WTRU. The WTRU may determine at least one of the first RO and the second RO based on the configuration information. For example, the second RO may be next in time to the first RO in a time domain, or the second RO and the first RO may not be contiguous in the time domain.

The WTRU may attempt to decode a random access response (RAR) using a random access radio network temporary identifier (RA-RNTI) associated with a preamble of the set of preambles or using an RA-RNTI associated with one or more of the first RO or the second RO. The WTRU may or may not receive an RAR to the transmission of a preamble. In an example, the WTRU may receive an RAR to the first preamble transmitted on the first RO and determine that an RAR to the second preamble that was transmitted on the second RO has not been received. Based on the determination that the RAR to the second preamble transmitted on the second RO has not been received, the WTRU may transmit a third preamble of the second subset of preambles on a third RO. The third preamble may be the same as the second preamble or different from the second preamble. In some examples, the WTRU may determine that the second preamble transmitted on the second RO indicates a feature of the feature combination, and, based on the determination that the RAR to the second preamble transmitted on the second RO has not been received, the WTRU may indicate the feature in a payload of an RAR grant.

DETAILED DESCRIPTION

Figure 1A:
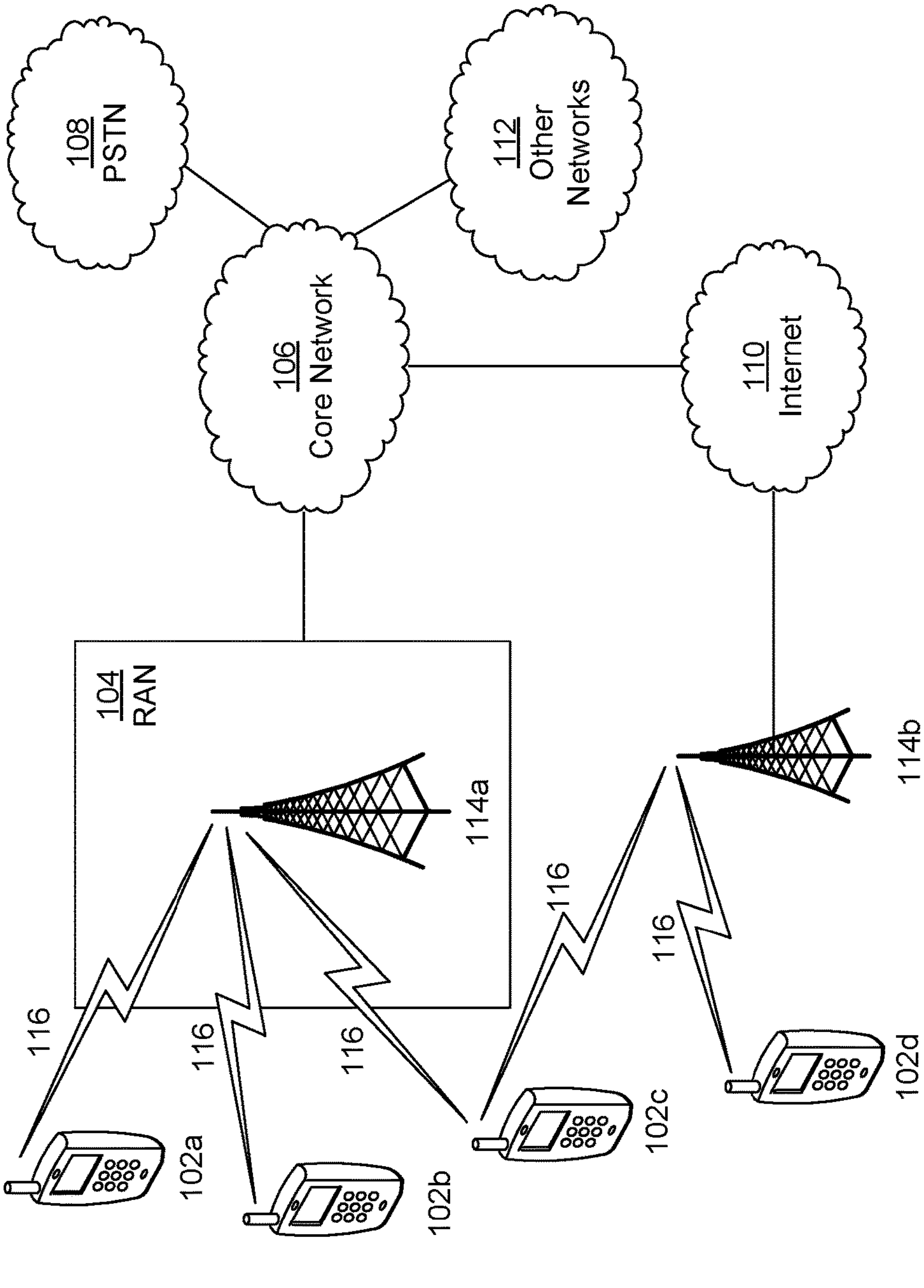
FIG. 1A is a system diagram illustrating an example communications system in which one or more disclosed embodiments may be implemented.

FIG. 1A is a diagram illustrating an example communications system 100 in which one or more disclosed embodimentsments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
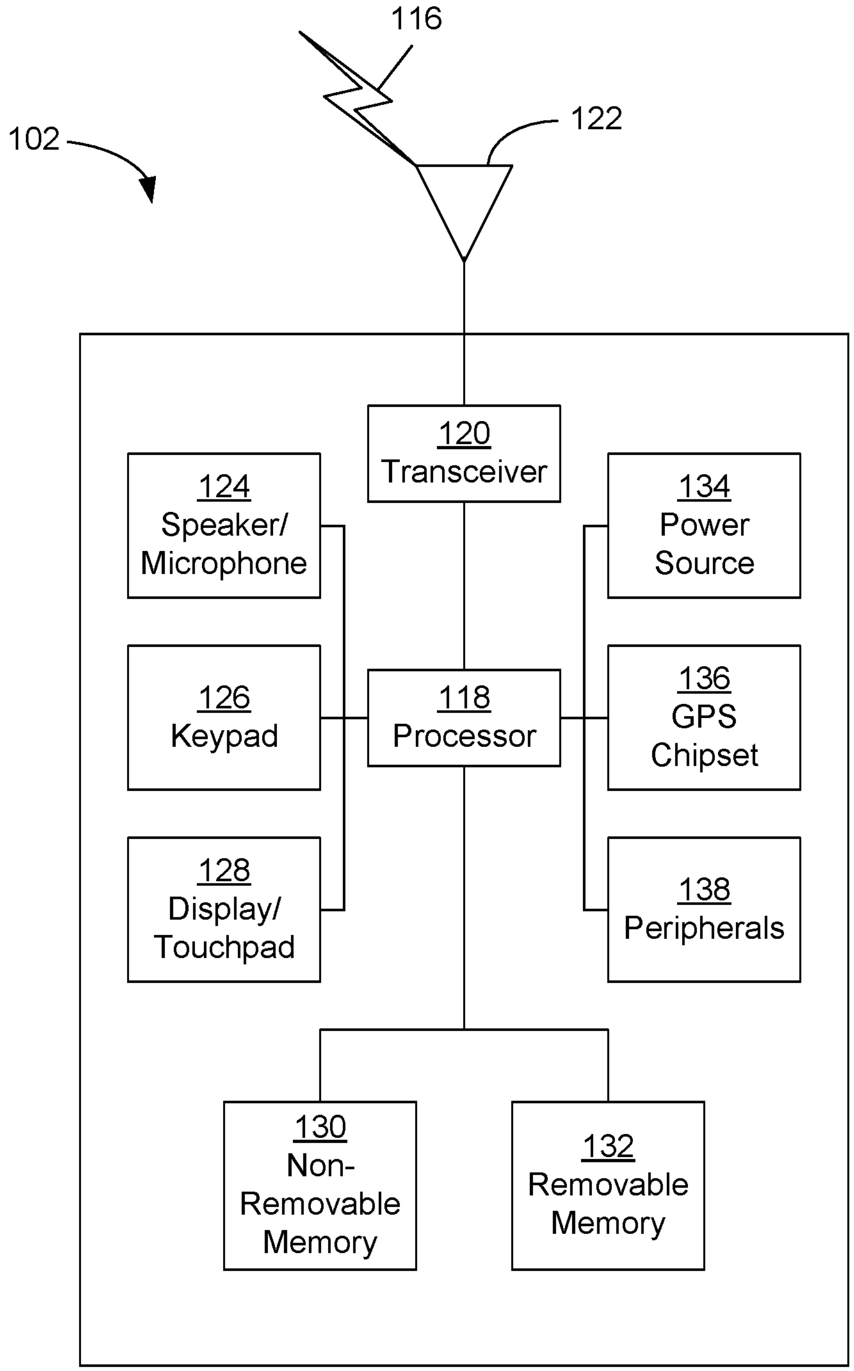
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
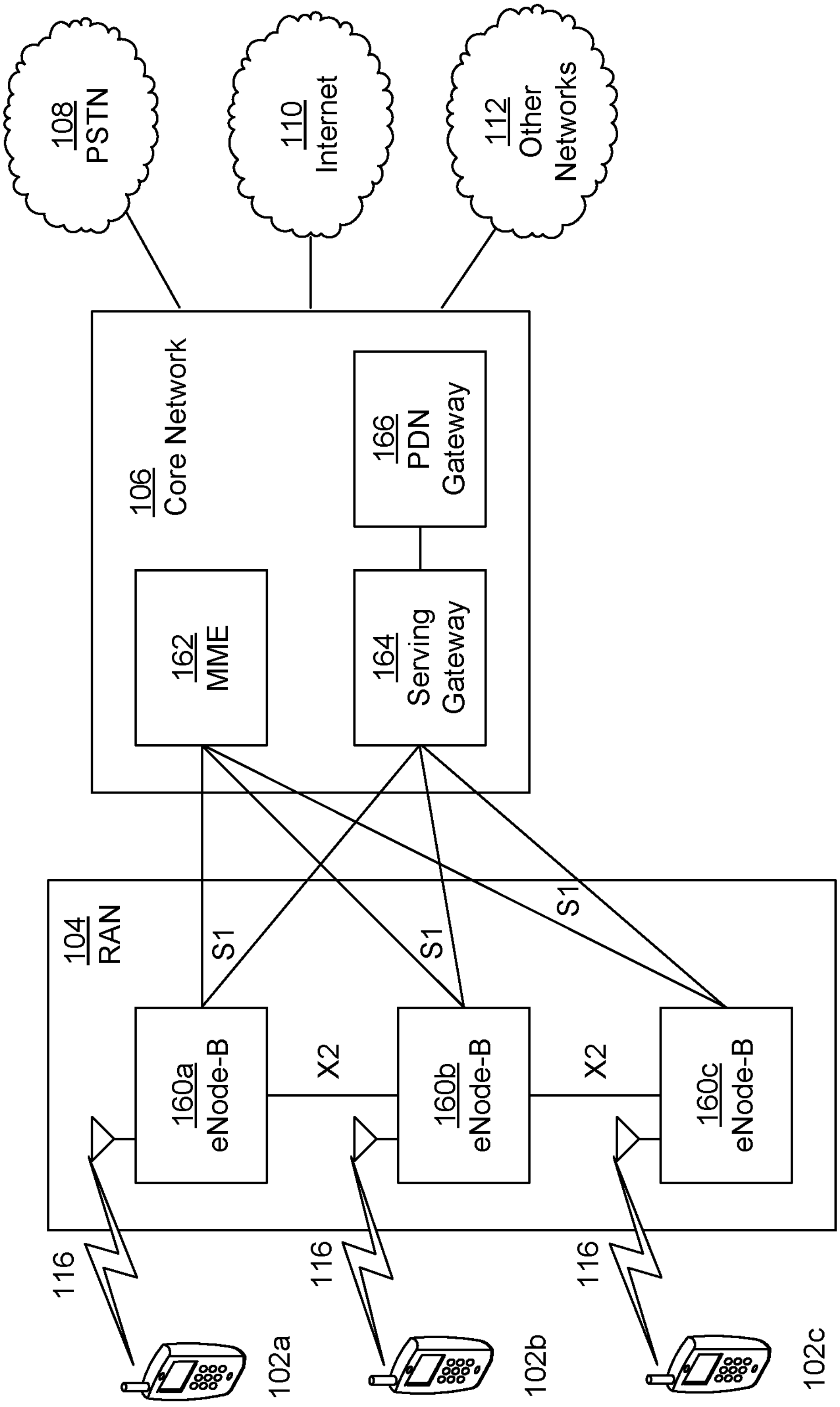
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
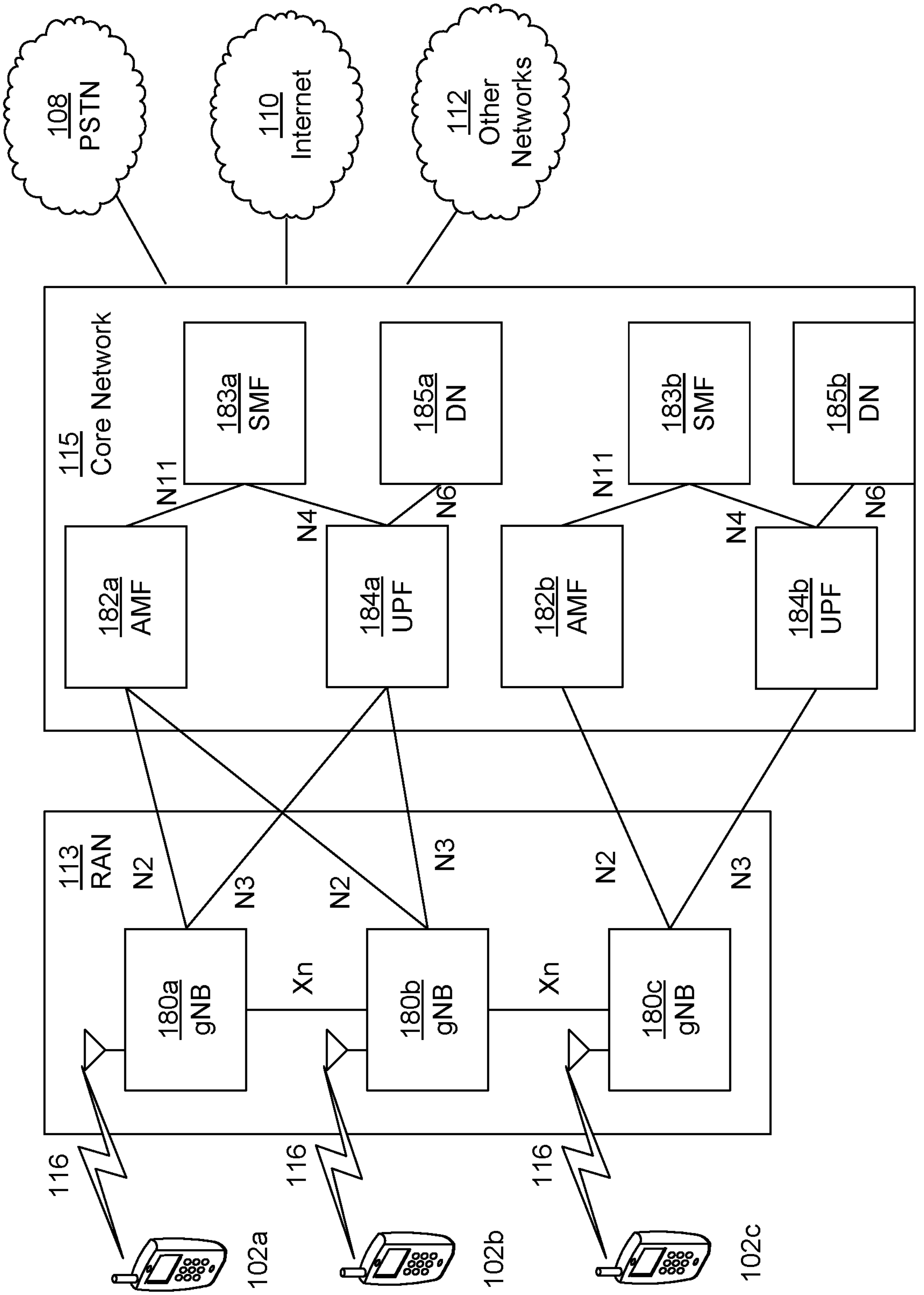
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein for super preamble partitioning and/or random access (RA) procedure.

A wireless transmit/receive unit (WTRU) may transmit a combination of preambles to indicate one or more of a feature, a feature combination, a capability combination, or a use case. A super preamble may include a combination of two or more preamble transmissions. The WTRU may receive radio resource control (RRC) or broadcast signaling to link a first random access channel occasion (RO) and/or a first preamble index for a first preamble transmission to a second RO and/or preamble index for a second preamble transmission (e.g., an association between ROs of a super preamble). The RRC or broadcast signaling may indicate a partition of a super preamble per one or more of a feature, a capability, a feature combination, and/or a use case. The WTRU may select a preamble combination (e.g., a super preamble) to indicate one or more of the feature, the capability, the feature combination, and/or the use case according to the configured super preamble partition. The WTRU may select the preamble combination based on the one or more of the feature, the capability, the feature combination, and/or the use case to indicate or which has initiated the RA procedure. During the RA procedure, the WTRU may monitor for a different random access response (RAR) or MsgB format if the WTRU has transmitted a super preamble. For example, the RAR (e.g., an enhanced RAR) or the MsgB format may contain a preamble index of the super preamble or preamble indices of the first preamble transmission and the second preamble transmission. The WTRU may retransmit the second preamble if the WTRU receives an RAR or MsgB corresponding to the first preamble and not the second preamble (e.g., an RAR or MsgB corresponding only to the first preamble). A payload of a grant of an RAR may also provide one or more indications herein.

A WTRU may receive configuration information, determine a preamble combination based on a feature/feature combination and the configuration information, where the preamble combination may include a first preamble and a second preamble; and transmit the preamble combination. The configuration information may indicate one or more preambles. The configuration information may indicate that a first RO of the first preamble is associated with a second RO of the second preamble. The configuration information may indicate that a first preamble index of the first preamble is associated with a second preamble index of the second preamble. The configuration information may indicate a partition associated with the preamble combination and the feature/feature combination corresponding to the partition. The WTRU may monitor for a random access response (RAR) that includes a preamble index associated with the preamble combination or preamble indices associated with the first preamble and the second preamble. The WTRU may receive an RAR including a preamble index of the first preamble and no preamble index of the second preamble and transmit the second preamble.

Systems, methods, and instrumentalities are described herein for indicating a feature combination associated with a wireless transmit/receive unit (WTRU) by determining a set of preambles based on the feature combination associated with the WTRU.

A WTRU may receive configuration information that indicates random access channel occasions (ROs), for example, a first RO and a second RO. The ROs may be associated, and the configuration information may indicate the association of the ROs. The WTRU may be associated with a feature combination. The WTRU may determine the feature combination associated with the WTRU. The WTRU may determine a set of preambles based on the feature combination associated with the WTRU. The set of preambles may include multiple subsets of preambles, for example, a first subset of preambles and a second subset of preambles. The first subset of preambles may be associated with the first RO of the associated ROs. The second subset of preambles may be associated with the second RO of the associated ROs. The WTRU, for example, to indicate the feature combination associated with the WTRU to a network, may transmit a first preamble of the first subset of preambles on the first RO of the associated ROs and a second preamble of the second subset of preambles on the second RO of the associated ROs.

The WTRU may indicate the feature combination and/or information associated with the feature combination by transmitting the first preamble on the first RO and a second preamble on the second RO. For example, the first preamble transmitted on the first RO may indicate the feature combination, and the second preamble transmitted on the second RO may indicate additional information associated with the feature combination. The additional information associated with the feature combination may indicate one or more of: a feature of the feature combination, a distinction among features of the feature combination, or a randomized preamble selection by WTRUs that select the feature combination.

The feature combination associated with the WTRU may include one or more features. For example, a feature of the one or more features may be indicated by a combination of the first preamble and the second preamble. In some examples, each of the first preamble and the second preamble may indicate the feature.

The configuration information that indicates the associated ROs may indicate one or more of an association of the set of preambles with the feature combination, an association of the first subset of preambles with the first RO, or an association of the second subset of preambles with the second RO. The WTRU may determine the set of preambles based on the configuration information that indicates the association of the set of preambles with the feature combination and based on the feature combination associated with the WTRU. The WTRU may determine at least one of the first RO and the second RO based on the configuration information. For example, the second RO may be next in time to the first RO in a time domain, or the second RO and the first RO may not be contiguous in the time domain.

The WTRU may attempt to decode a random access response (RAR) using a random access radio network temporary identifier (RA-RNTI) associated with a preamble of the set of preambles or using an RA-RNTI associated with one or more of the first RO or the second RO. The WTRU may or may not receive an RAR to the transmission of a preamble. In an example, the WTRU may receive an RAR to the first preamble transmitted on the first RO and determine that an RAR to the second preamble that was transmitted on the second RO has not been received. Based on the determination that the RAR to the second preamble transmitted on the second RO has not been received, the WTRU may transmit a third preamble of the second subset of preambles on a third RO. The third preamble may be the same as the second preamble or different from the second preamble. In some examples, the WTRU may determine that the second preamble transmitted on the second RO indicates a feature of the feature combination, and, based on the determination that the RAR to the second preamble transmitted on the second RO has not been received, the WTRU may indicate the feature in a payload of an RAR grant.

Figure 2:
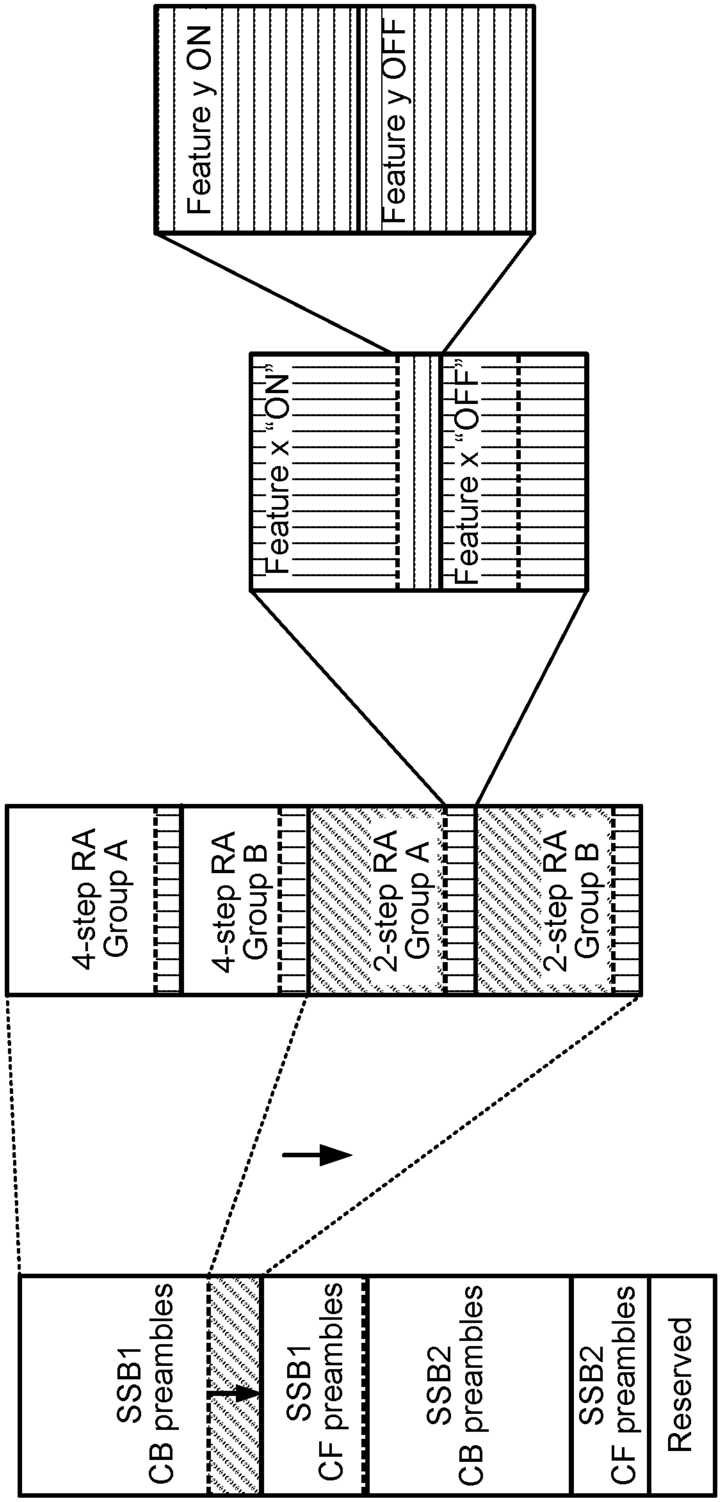
FIG. 2 illustrates an example of an exponential growth of the number of partitions used to indicate a number of features.

PRACH resource partitioning may be used to indicate one or more of the best SSB, 2-step vs. 4-step RACH, and/or message 3 size (group A vs. B). Further PRACH partitioning may be used based on one or more of the following features: RedCap (e.g., to indicate reduced capability device type to the NW); SDT (e.g., to distinguish the RA procedure in order to support larger payload sizes for SDT); CovEnh (e.g., to indicate the need for coverage enhancement for Msg3 repetition); Slicing (e.g., to indicate high priority slice(s) to the NW and/or to achieve a slice isolation for RACH). Some of the features may be supported by the same device, for example, simultaneously (e.g., an IIoT redcap device supporting SDT on a given slice). Partitions may be used to indicate combinations of one or more of the features herein. In some examples, 64 preambles may not be sufficient to support all of these feature indication combinations in a single RO. The number of RACH partitions may grow (e.g., exponentially) with the number of features. For example, to indicate a combination of k features, $2^k$ PRACH partitions may be used, assuming the featured are introduced together (e.g., without impact to legacy WTRU preamble selection (s)). The number of partitions may grow even further if features are not introduced together (e.g., introduced in successive releases), and/or legacy WTRU preamble selection(s) are not to be changed. FIG. 2 illustrates an example of an exponential growth of the number of partitions used to indicate a number of features. For a (e.g., each) feature combination, a partition may be further repeated per SSB and/or per Group A/B set. In an example, the overhead may be scaled by 2×N, where N is the number of SSBs multiplexed in the same RO in the cell. Assuming a (e.g., each) feature partition is allocated P preambles (e.g., new preambles) in the example, the total number of preambles (e.g., new preambles) used to indicate feature combinations (e.g., new feature combinations) using an ad-hoc method may be: the number of preambles Ad-hoc (e.g., the number of required new preambles$^{Ad\text{-}hoc}$)$=2\times N\times P\times 2^K$. For example, if N=6; K=4; P=8, the number of preambles is 1536 (24 ROs).

A physical random access channel (PRACH) resource may include one or more of the following: a PRACH resource in frequency, a PRACH occasion or a RACH occasion (RO) (e.g., in time), a preamble format (e.g., in terms of one or more of a total preamble duration, a sequence length, a guard time duration and/or a length of cyclic prefix) and/or a certain preamble sequence (e.g., a preamble sequence used for the transmission of a preamble in a random access procedure).

Small data may include uplink shared channel (UL-SCH) data (e.g., non-common control channel (CCCH)) transmitted by the WTRU, e.g., in a non-connected mode.

In examples, MsgA may include preamble and payload transmission(s) on PRACH and physical uplink shared channel (PUSCH) resources respectively in a 2-step random access (RA) procedure (e.g., the 2-step RA procedure as defined in TS 38.321).

In examples, MsgB may include the downlink response to MsgA, which may be a success random access response (RAR), a fallback RAR, or a backoff indication, for example, as defined in TS 38.321.

In examples, an RO may be a RACH occasion, for example, as defined in TS 38.321.

A super preamble may include a certain combination (e.g., a unique combination) of two or more preamble transmissions.

The term feature and the term use case may be used interchangeably in one or more examples herein. A use case may correspond to the indication or one or more WTRU features or capabilities.

A property of scheduling information (e.g., an uplink grant or a downlink assignment) may include (e.g., consist of) at least one of the following: a frequency allocation; an aspect of time allocation, such as a duration; a priority; a modulation and coding scheme; a transport block size (TBS); a number of spatial layers; a number of transport blocks (TBs) to be carried; a transmission configuration indicator (TCI) state or SRS resource indicator (SRI); a number of repetitions; whether the grant is a configured grant type 1, type 2 or a dynamic grant.

An indication by downlink control information (DCI) may include (e.g., consist of) at least one of the following: an explicit indication by a DCI field or by a radio network identifier (RNTI) used to mask cyclic redundancy check (CRC) of a physical downlink control channel (PDCCH) (e.g., a PDCCH transmission); an implicit indication by a property such as one or more of a DCI format, a DCI size, a control resource set (CORESET) or search space, an aggregation level, and/or an identity of the first control channel resource (e.g., an index of the first control channel element (CCE) for a DCI, where the mapping between the property and the value may be signaled by radio resource control (RRC) or medium access control (MAC).

PRACH resource partitioning may be used (e.g., by the WTRU to indicate to the network) to indicate the selection and/or preference of one or more of a certain feature, a certain priority, a certain synchronization signal and/or physical broadcast channel block (SSB), or a certain TBS; the NW may determine an indication from the index of the received preamble and/or the RO selected for the preamble transmission.

Further PRACH partitioning may be used. Further PRACH partitioning may be used in association with one or more of the following features: RedCap, small data transmission (SDT), CovEnh, Slicing. WTRU(s) may be configured to support different feature combinations herein according to the WTRUs' capabilities. For example, an IoT WTRU may be a RedCap device and support SDT transmission on a given slice. Partitions may be used to indicate feature combinations. In some examples, 64 preambles may not be sufficient to support the feature combinations (e.g., not be sufficient to support all of the feature indication combinations in a single RO). The number of RACH partitions may grow (e.g., exponentially) with the number of feature combinations. For example, to indicate a combination of k features, $2^k$ PRACH partitions may be used. It may be assumed that the features are introduced together, for example, without impact to the legacy WTRU preamble selection(s). The number of partitions may grow even further, for example, if features are not introduced together (e.g., in successive releases) and the legacy WTRU preamble selection(s) are not to be changed. One or more examples herein may be used to improve capacity and/or efficiency without growing partitions exponentially with the number of feature combinations.

Multi-PRACH transmissions may be used for use case indication(s).

Figure 3A:
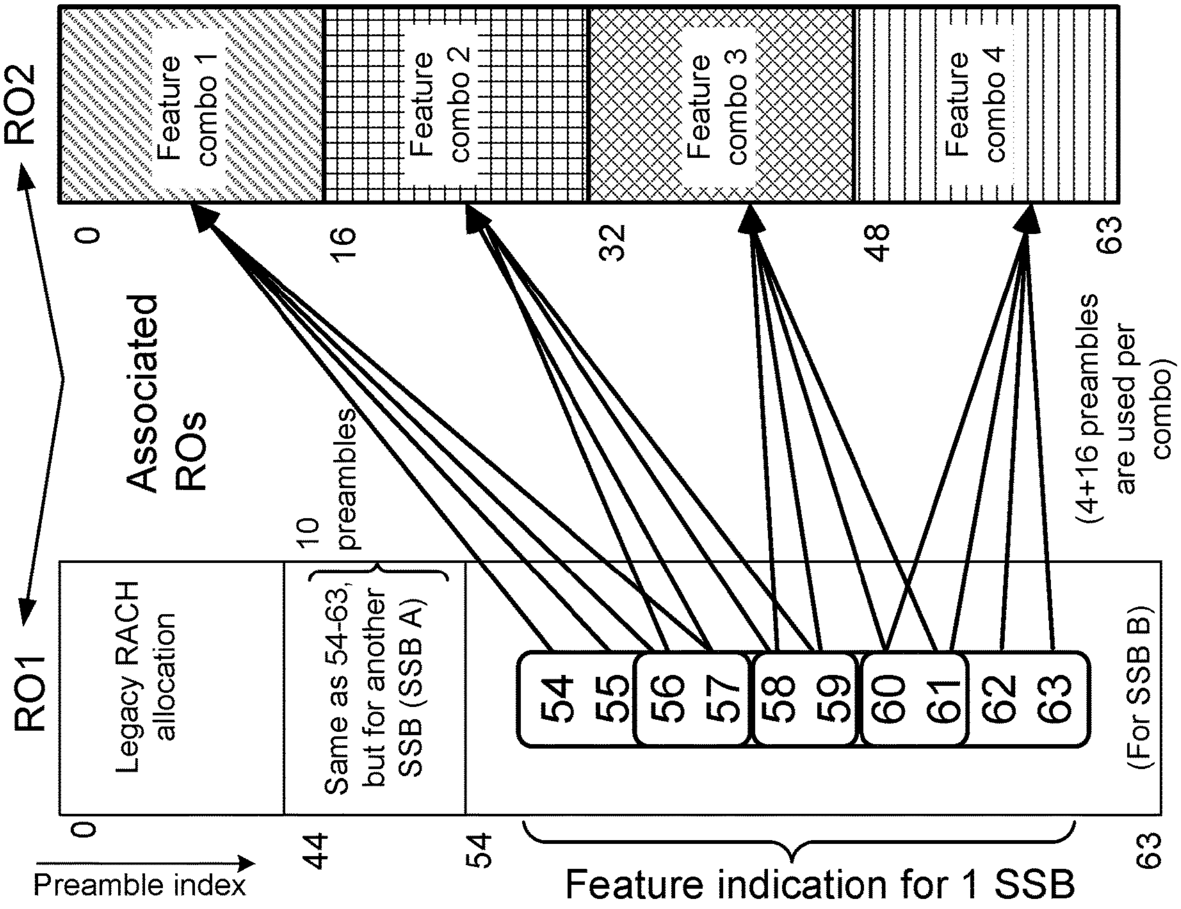
FIG. 3A illustrates an example of using a set of preambles to indicate a feature combination.

A WTRU may transmit two preamble transmissions or a combination of multiple preamble transmissions to indicate one or more of a feature, a capability, feature combination (s), capability combination(s), or feature and capability combination(s). For example, a $1^{st}$ preamble transmission or a $1^{st}$ preamble may indicate one or more of a first feature, a first feature combination, and/or a first capability, and/or a $2^{nd}$ preamble transmission or a $2^{nd}$ preamble may be for randomization (e.g., a randomized preamble selection by multiple WTRUs) and/or an indication of one or more of a second feature, a second feature combination, and/or a second capability. A $1^{st}$ preamble transmission or a $1^{st}$ preamble may correspond to an intersection of a number of features (e.g., a feature combination), and/or a $2^{nd}$ preamble transmission or a $2^{nd}$ preamble may distinguish which of these features, for example, by indicating a distinction among these features. A (e.g., each) combination of the $1^{st}$ and $2^{nd}$ preambles may be associated with a respective feature, a feature combination, or a set thereof. As shown in the example in FIG. 3A, the WTRU may indicate feature combination 1 using the set of preambles including preambles 54-57 on RO1 and preambles 0-15 on RO2. In FIG. 3A, the set of preambles including preambles 56-59 on RO1 and preambles 16-31 on RO2 may be associated with feature combination 2. In some examples, more than one combinations of the $1^{st}$ and $2^{nd}$ preambles may be associated to one feature.

Super preamble may be used for use case indication(s).

A preamble transmission may include one or more preambles, for example, a $1^{st}$ preamble transmission and a $2^{nd}$ preamble transmission. The $1^{st}$ preamble transmission may be a transmission of a $1^{st}$ preamble of a first subset of preambles, for example, based on a feature combination. The network (NW) may configure a subset of preambles and/or ROs for the $1^{st}$ preamble transmission or the $1^{st}$ preamble (e.g., a first subset on some PRACH resources), possibly per feature, use case, or feature combination. The $2^{nd}$ preamble transmission may be a transmission of a $2^{nd}$ preamble of a second subset of preambles, for example, based on the feature combination. The NW may further configure a subset of preambles and/or ROs for the $2^{nd}$ preamble transmission or the $2^{nd}$ preamble (e.g., a second subset on some PRACH resources), possibly per feature, use case, or feature combination.

In an example, a set of preambles comprising the first subset and the second subset may be determined based on the feature combination. FIG. 3A illustrates an example of using a set of preambles to indicate a feature combination. As shown in FIG. 3A, a WTRU may transmit a super preamble (e.g., 2 preambles) in associated ROs to indicate an SSB and/or a feature combination. Based on the SSB and/or the feature combination the WTRU wants to indicate, the WTRU may determine the partition associated with the feature combination in RO1 and/or the associated RO2. The WTRU may select (e.g., randomly select) a preamble among preambles in an associated partition in RO1 and transmits msg1. The WTRU may select (e.g., randomly select) a preamble among preambles in an associated partition in RO2 and transmits msg1. The WTRU may monitor for an RAR using an RA-RNTI for the preambles (e.g., each of the preambles) or using a combined RA-RNTI. For example, SSB B and/or feature combination 2 may be indicated. The WTRU may select (e.g., randomly select): a preamble for RO1 from among 56-59 and a preamble for RO2 from 17-32. In the example shown in 3A, in RO1, there are 10 preambles per SSB×2 SSBs=20 preambles+64 (16×4 combos) preambles in RO2=84 preambles for all the combinations for 2 SSBs. An alternative partitioning (e.g., legacy partitioning) requiring similar randomness of (4+16) preambles per combination may require 20 per SSB per combination=20 preambles×2 SSBs×4 combos=160 preambles (which would require at least one RO per SSB). The example in FIG. 3A may increase savings with more SSBs and more features and/or feature combinations.

The set of preambles in FIG. 3A includes preambles with preamble indices 54-57 on RO1 and includes preambles with preamble indices 0-15 on another RO, for example, RO2. RO1 and RO2 may be associated, for example, based on configuration information that indicates the association of RO1 and RO2. The set of preambles may be associated with feature combination 1. The WTRU may indicate feature combination 1 using the set of preambles including preambles with preamble indices 54-57 on RO1 and preambles with preamble indices 0-15 on RO2. In the example shown in FIG. 3A, the set of preambles including preambles 56-59 on RO1 and preambles 16-31 on RO2 may be associated with feature combination 2. The set of preambles including preambles 58-61 on RO1 and preambles 32-47 on RO2 may be associated with feature combination 3. The set of preambles including preambles 60-63 on RO1 and preambles 48-63 on RO2 may be associated with feature combination 4. In the example shown in FIG. 3A, on RO1, preambles 0-43 may use legacy RACH allocation. Preambles 44-53 may or may not use legacy RACH allocation, and, for example, preambles 44-53 may used non-legacy RACH allocations. Preambles 54-63 may or may not use legacy RACH allocation, and, for example, preambles 54-63 may used non-legacy RACH allocations. Preambles 44-53 may be associated with SSB A, and preambles 54-63 may be associated with another SSB, for example, SSB B. Preambles 54-63 may be used for feature indication for one SSB, for example, SSB B.

A super preamble may include a combination (e.g., a unique combination) of two or more preamble transmissions, for example, a $1^{st}$ preamble transmission and a $2^{nd}$ preamble transmission. As shown in FIG. 3A, the $1^{st}$ preamble transmission may be a transmission of a preamble from the subset of preambles with preamble indices 54-57, for example, on RO1. The $2^{nd}$ preamble transmission may be a transmission of a preamble from the subset of preambles with preamble indices 0-15, for example, on RO2. In an example, the NW may create a space of unique super preambles with the size equaling up to: the number of preambles in the first subset x the number of preambles in the second subset. For example, over two ROs, each with 64 available preambles, the WTRU may select a super preamble to indicate one of up to $64^2$ unique indications. The number of possible unique indications in 2 transmissions of a super preamble=#preambles possible for selection in the $1^{st}$ RO×#preambles for selection in the $2^{nd}$ RO.

The set of super preambles that a WTRU may select from may include a subset of possible combinations of the $1^{st}$ and $2^{nd}$ preambles. A (e.g., each) such combination may be referred to as a valid super preamble in one or more examples herein, and the subset may be referred to as the valid set in one or more examples herein. The WTRU may determine a valid set using one of the following: the WTRU may receive an explicit list of $N_{sp}$ combinations of preambles, where Nsp may be the size of the valid set; the WTRU may determine a valid set as the combinations (e.g., all possible combinations) of a first subset of the $1^{st}$ preamble and a second subset of the $2^{nd}$ preamble. By extension, the WTRU may determine a valid set as the union of more than one such set of combinations of multiple subsets (e.g., the union of more than one such set of combinations of a first and second subsets). For example, a valid set may be the union of a first set of combinations including (e.g., consisting of) combinations of first preambles 32 to 47 and second preambles 50 to 57 and of a second set of combinations including (e.g., consisting of) combinations of first preambles 48 to 63 and second preambles 58 to 63. One subset of preambles may be configured per RO per feature combo. A network may configure the subset (i.e., whether to overlap it with another feature or not). In some examples, overlapping (e.g., of the subsets of preambles) may be avoided.

The WTRU may be configured with more than one valid set of super preambles. A valid set of super preambles may be configured based on one or more of a use case, an SSB, a feature combination, or a feature, and/or on a subset of PRACH resources.

The WTRU may transmit first preamble(s) of a super preamble in a first set of ROs. The WTRU may transmit second preamble(s) of a super preamble in a second set of ROs. The first sets of ROs and the second sets of ROs may be configured. For example, the first set of ROs and the second sets of ROs may be defined, for example, such that a RO of the first set is next in time to (e.g., immediately followed in time by) a RO of the second set, or a RO of the second set is next in time to (e.g., immediately followed in time by) a RO of the first set. In some examples, the second RO of the second set and the first RO of the first set are not contiguous in the time domain.

One or more of the following parameters may be signalled (e.g., signalled to WTRU(s) and/or determined (e.g., by WTRU(s) based on a feature or feature combination: for example, preamble(s) to transmit, PRACH resource(s) to use for a transmission, partition(s) on a RO, SSB(s) to use for a transmission, a RO to use for a transmission. The WTRU may receive signalling indicating parameters associated with a valid set (e.g., parameters defining each valid set of preambles or super preambles). For example, such signalling may be part of an extended PRACH configuration information element in system information or dedicated signalling. Such signalling may indicate a partitioning between preambles used for single-preamble transmission(s) (e.g., as in a legacy operation), and preambles that are used for super preamble transmission(s). For example, the WTRU may receive parameters indicating the lowest possible value for the first preamble of a super preamble (transmission) and the lowest possible value for the second preamble of the super preamble (transmission). The WTRU may determine that the maximum preamble index for single-preamble transmission (s) (e.g., as per legacy) in a RO corresponds to the lowest possible value associated a super preamble (transmission) in that RO.

A valid super preamble may be identified by a certain index (e.g., a unique index). For example, the possible values of the index may range from 0 to Nv−1. Nv may be the total number of valid super preambles across the valid sets (e.g., all valid sets).

In some examples, possible values may range from 64 to 64+Nv−1 to reserve values 0 to 63 to legacy preamble indexes. The index may be used for the identification of a super preamble in an RAR. The WTRU may associate an index to a super preamble, for example, using a formula or a table.

Preambles may be linked. Preamble and/or RO patterns may be configured.

To link preamble transmissions within a super preamble (e.g., to link $1^{st}$ preamble reception and $2^{nd}$ preamble reception), the NW may configure the WTRU with an RO(s) and/or a preamble selection pattern, for example, using configuration information that indicates associated RO(s) and preamble selection pattern(s). A WTRU may receive the configuration information that indicates associated RO(s) and preamble selection pattern(s). A preamble may be associated with PRACH resource(s). For example, a first preamble may be associated with first PRACH resource(s), and a second preamble may be associated with second PRACH resource(s). The WTRU may select PRACH resource(s) for a preamble based on (e.g., as a function of) the PRACH resource selected for a different preamble (e.g., the previous preamble) in the super preamble. For example, as shown in FIG. 3A, a WTRU may select PRACH resource(s) on RO2 for a preamble with preamble index 9 based on PRACH resource(s) on RO1 for a preamble with preamble index 54.

ROs may be associated, for example, based on configuration information. The NW may configure the WTRU with a RO pattern, for example, using configuration information that indicates associated ROs. Associated ROs (e.g., RO pairs) may not be contiguous and/or may be disjoint, for example, such that the NW knows which feature combination is indicated. For example, a $1^{st}$ preamble may be transmitted on partition A of RO x, and then a $2^{nd}$ preamble may be transmitted on partition B of RO y. As shown in the example of FIG. 3A, preamble 55 may be transmitted (e.g., by a WTRU) on partition 54-57 of RO1, and then preamble 10 may be transmitted on partition 0-15 of RO2. RO1 and RO2 may not be contiguous. The NW may identify a WTRU that transmits a $1^{st}$ preamble on partition A of RO x, and then a $2^{nd}$ preamble on partition B of RO y as a RedCap WTRU performing small data etc.

A $1^{st}$ preamble may be selected and/or transmitted on a first RO. The NW may configure the subset of ROs applicable for the $2^{nd}$ preamble transmission based on (e.g., as a function of) one or more of the selected first preamble, the first RO, or the selected feature indicated in the first preamble transmission. A WTRU may receive configuration information that indicates one or more of an association of the first preamble and the second preamble, an association of the first preamble transmission and a second preamble transmission, an association of the first RO and second RO(s), and/or an association of a first feature (e.g., the feature indicated in the first preamble transmission) and a second feature (e.g., the feature to be indicated in the second preamble transmission). The NW may configure the WTRU with a partition of preambles in the subsequent RO that is linked to one or more of the selected first preamble, the first RO, and/or the selected feature indicated in the first preamble transmission. A WTRU may receive configuration information that indicates an association of a partition of preambles in a RO (e.g., a second RO subsequent to the first RO) with one or more of the selected first preamble, the first RO, and/or the selected feature indicated in the first preamble transmission.

A WTRU may be configured (e.g., preconfigured) with association(s) between the features and $1^{st}$ and $2^{nd}$ preamble and/or ROs. A WTRU may be configured with association(s) between the features (e.g., a feature combination) and a set of preambles (e.g., a $1^{st}$ preamble and a $2^{nd}$ preamble). A WTRU may be configured with association(s) between the features and RO(s). In an example, the WTRU may be preconfigured (e.g., by the NW) with association(s) between the features and $1^{st}$ and $2^{nd}$ preamble or ROs such that the WTRU does not send all of feature combinations. Some features combinations may not be permissible. Depending on one or more of the selected $1^{st}$ preamble, the $1^{st}$ RO and/or the feature, the WTRU may transmit from a subset of ROs for the $2^{nd}$ preamble transmission. For example, the NW may not support a combination of slicing WTRU capability and SDT capability. If the WTRU indicates to the NW that the WTRU is capable of supporting slicing, the WTRU may not send SDT capability during the second preamble transmission. $1^{st}$ preamble and $1^{st}$ preamble transmission may be used interchangeably in one or more examples herein. $2^{nd}$ preamble and $2^{nd}$ preamble transmission may be used interchangeably in one or more examples herein.

A WTRU may be configured with priorities of WTRU capability transmission(s). In an example, the WTRU may be configured (e.g., by the NW) with priorities of WTRU capability transmission(s) in case of transmitting combinations of WTRU capabilities. For example, the WTRU may receive priority indication(s) from the NW that RedCap capability has higher priorities than other capabilities (e.g., coverage enhancement or SDT). The WTRU may be configured to indicate RedCap capability (e.g., transmit RedCap WTRU) during the $1^{st}$ preamble transmission if the WTRU supports at least RedCap capability. If the WTRU supports coverage enhancement capability in addition to RedCap or slice capability, the WTRU may indicate the capability during the $2^{nd}$ preamble transmission. WTRU capabilities by priorities and/or the ordering (e.g., ordering of transmissions) based on the priorities may enable expedient configuration of Tx/Rx parameters for the WTRU capability with a higher priority.

The WTRU can be configured such that within a given RO, a $1^{st}$ partition may be configured to indicate a $1^{st}$ transmission (e.g., a $1^{st}$ preamble transmission), and a $2^{nd}$ partition may be configured to indicate a $2^{nd}$ transmission (e.g., a $2^{nd}$ preamble transmission). For example, a first preamble transmission may be indicated by the partition 54-57 on RO1 in FIG. 3A, and a second preamble transmission may be indicated by the partition 58-61 on RO1 in FIG. 3A.

Figure 3:
FIG. 3 illustrates an example of ROs and/or partitions.

FIG. 3 illustrates an example of ROs and/or partitions. FIG. 3 illustrates preamble partitioning across features and SSBs using super preambles transmitted over two ROs (e.g., RO1 and RO2, or RO3 and RO4).

A RO selection may be based on (e.g., as a function of) a previously selected RO.

A WTRU may be configured (e.g., by Radio Resource Control (RRC) or broadcast signalling) with an association of ROs (e.g., between ROs of a super preamble), for example, per feature or use case. The WTRU may be configured or be specified to indicate some features (e.g., latency sensitive features like high priority slicing) to the NW by a (e.g., a single) preamble transmission. The WTRU may be configured or be specified to indicate some features (e.g., other non-latency critical features or use cases (e.g., SDT, Redcap, and CovEnh) by two or more preamble transmissions.

A WTRU may be configured (e.g., by RRC or broadcast signalling) with a time (e.g., a minimum time and/or a maximum time) between occasions of preamble transmissions within a super preamble, and/or be configured with a number of ROs (e.g., a minimum and/or a maximum number of ROs) between preamble transmissions of a super preamble. The WTRU may select (e.g., randomly select) the RO for the next preamble transmission, for example, within the configured maximum time. The next preamble transmission may be the $2^{nd}$ preamble transmission. The WTRU may determine a different second subset (e.g., a second subset of preambles, a second subset of ROs, and/or a second subset of other parameters herein) applicable for the $2^{nd}$ preamble transmission based on (e.g., as a function of) the selected RO, and/or the time difference from the first preamble transmission.

Figure 4A:
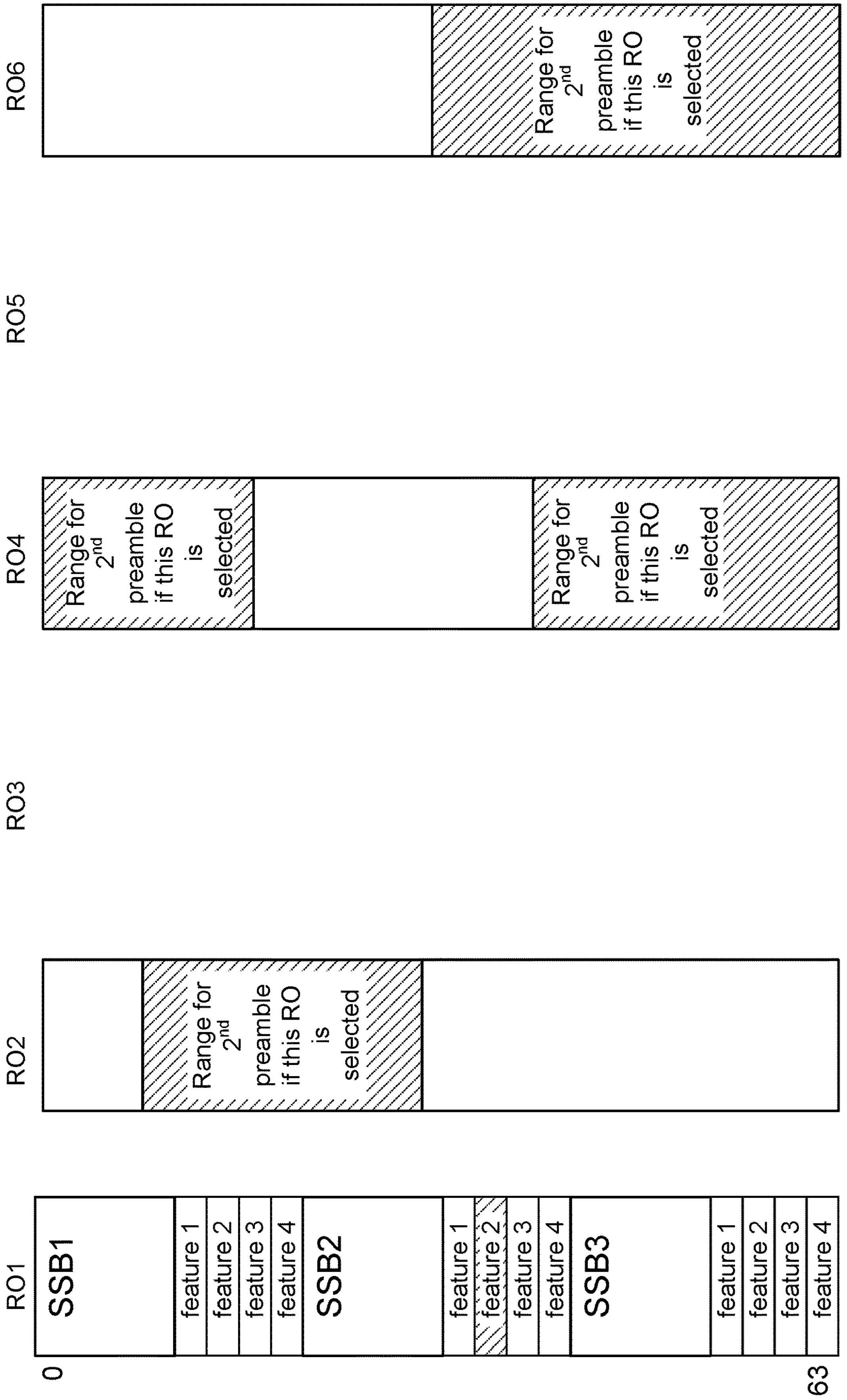
FIG. 4A illustrates an example of ROs.
Figure 4B:
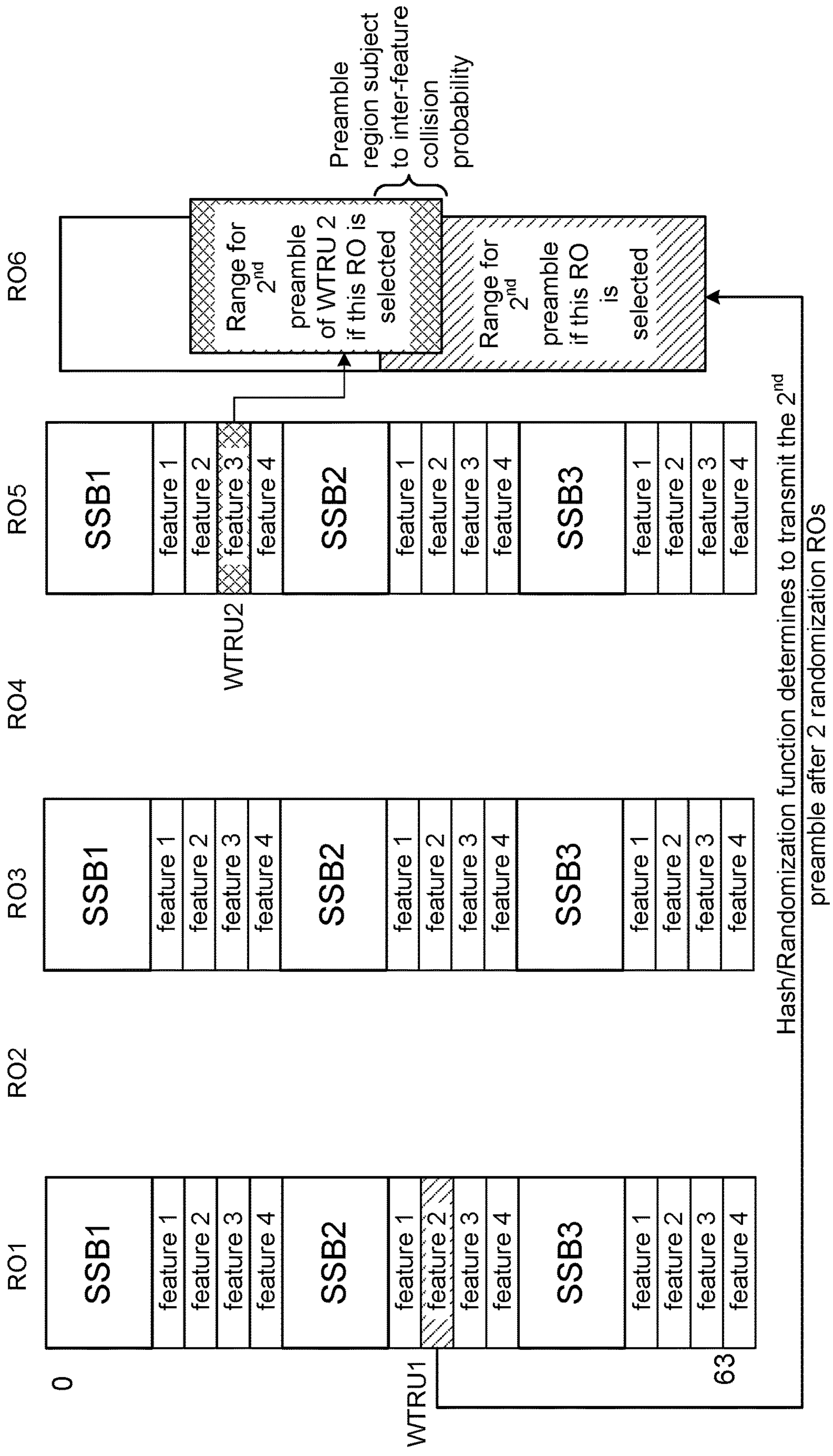
FIG. 4B illustrates an example of ROs.

FIG. 4A illustrates an example of ROs. FIG. 4A illustrates a configured preamble space (e.g., a preamble hopping pattern) for the transmission of the $2^{nd}$ preamble of a super preamble. The preamble space illustrated in FIG. 4A may be dependent on the timing of the second RO (e.g., depending on whether the transmission of the $2^{nd}$ preamble is on RO2, RO4, or RO6). FIG. 4B illustrates an example of ROs. FIG. 4B illustrates a randomization hash function that may be used to determine the timing of the second RO of a super preamble. As shown in FIG. 4B, WTRU 1 may transmit the $2^{nd}$ preamble on RO6 after 2 randomization ROs (e.g., RO3 and RO5). In some examples, WTRU 2 may transit the $2^{nd}$ preamble on RO6, a part (e.g., region) of which may be subject to inter-feature collision probability. One or more of parameters, variables, values, factors, or conditions may be configured, for example, for a feature, feature combination, and/or 26apability (ies). As an example, one or more of the following may be configured (e.g., by the NW), broadcast, or predefined, for example, for a feature, feature combination, and/or capability: #preambles per RO for the $1^{st}$ transmission (e.g., the $1^{st}$ preamble transmission), preamble start index for the $1^{st}$ transmission, the set of ROs applicable for the $1^{st}$ transmission, herein denoted as "Romask_$1^{st}$", #preambles per RO for the $2^{nd}$ transmission (e.g., the $2^{nd}$ preamble transmission), preamble start index for the $2^{nd}$ transmission, the set of ROs applicable for the $2^{nd}$ transmission, herein denoted as "Romask_$2^{nd}$", the maximum duration (or the maximum number of ROs) between the first preamble transmission and the second preamble transmission, herein denoted as "maxPeriodbwPreambles," the minimum duration (or the minimum number of ROs) between the first preamble transmission and the second preamble transmission. #Preambles per RO for the $1^{st}$ transmission, preamble start index for the $1^{st}$ transmission, and Romask_$1^{st}$ may be used to indicate or define the preamble space "Preamble_subset_$1^{st}$". #Preambles per RO for the $2^{nd}$ transmission, preamble start index for the $2^{nd}$ transmission, Romask_$2^{nd}$" may indicate or define the preamble space "Preamble_subset_$2^{nd}$". A WTRU may determine one or more of the parameters, variables, values, factors, or conditions herein based on, for example, a feature, feature combination, and/or capability.

A WTRU may be configured, for example, via RRC information, with a number of preambles per feature combination in the reserved area of preambles in a RO (e.g., an RO shared with legacy WTRUs. Romask_$1^{st}$ may or may not be shared with legacy WTRUs, for example, per configuration. Romask_$2^{nd}$ may or may not be shared with legacy WTRUs, for example, per configuration.

A WTRU may select a $1^{st}$ preamble for transmission from Preamble_subset_1st, for example, after a RA procedure is initiated to indicate a given feature combination. The WTRU may determine (e.g., randomly determine) the RO for the $2^{nd}$ preamble transmission after the transmission of the first preamble. In an example, the WTRU may select the RO for the $2^{nd}$ preamble transmission (e.g., randomly) amongst ROs defined in by Romask_$2^{nd}$ and within maxPeriodbwPreambles from the instance of transmitting the $1^{st}$ preamble (e.g., within the maxPeriodbwPreambles starting after the transmission of the $1^{st}$ preamble). The WTRU may start a timer for the transmission of the $2^{nd}$ preamble after the transmission of the $1^{st}$ preamble, and the WTRU may transmit the $2^{nd}$ preamble (e.g., using the next valid preamble) after the expiry of the timer. In an example, a value of the timer may be selected randomly (e.g., initially between [0 and maxPeriodbwPreambles]).

A WTRU may be configured to determine the $2^{nd}$ preamble index.

The WTRU may determine the preamble index within Preamble_subset_$2^{nd}$ based on (e.g., as a function of) one or more of the RO selected for the $2^{nd}$ transmission (e.g., the $2^{nd}$ preamble transmission), the RO selected for the $1^{st}$ transmission (e.g., the $1^{st}$ preamble transmission), the preamble index selected for the $1^{st}$ transmission, and/or the period (and/or the number of ROs) between the $1^{st}$ transmission and the $2^{nd}$ transmission. In an example, the WTRU may use a formula to determine the preamble index for the $2^{nd}$ transmission.

The following may be an example formula: Preamble index range for the $2^{nd}$ transmission "Range"={Preamble start index for the $2^{nd}$ transmission+offset, Preamble start index for the $2^{nd}$ transmission+offset+#Preambles per RO for the $2^{nd}$ transmission}. Offset used in the formula may be an offset that can be used to shift the preamble start range according to the selected RO. For example, Offset may be the following: Offset=(index of RO for the $2^{nd}$ transmission−index of RO for the $1^{st}$ transmission−1)×shift, or Offset=mod {index of RO for the $2^{nd}$ transmission, index of the RO for the $1^{st}$ transmission}×shift, where "shift" is an integer number of preambles, for example, configured, predefined, or broadcast by the NW. If the Range exceeds preamble index 63, the range may be circularly shifted between 0 and 63 and/or wrapped around to include preambles {0, max (Range)-63}. Although one or more examples herein are described in terms of two preambles, two preamble transmissions, or two ROs, these examples are also applicable to more than two preambles, more than two preamble transmissions, or more than two ROs.

RAR/MsgB monitoring may be performed.

Depending on channel conditions or collisions, the NW may be able to successfully receive and/or decode the first preamble, for example, without successfully receiving or decoding the second preamble, or the NW may be able to successfully receive and/or decode the second preamble, for example, without successfully receiving or decoding the first preamble.

In the event of a preamble collision (e.g., a preamble collision of the second preamble only or the first preamble only), the NW may be able to address colliding WTRUs (e.g., uniquely address both colliding WTRUs), for example, by signalling a super preamble index in RAR/MsgB, or by signaling two RARs corresponding to the $1^{st}$ index (e.g., a preamble index for the $1^{st}$ transmission or an index of RO for the $1^{st}$ transmission) and $2^{nd}$ index (e.g., a preamble index for the $2^{nd}$ transmission or an index of RO for the $2^{nd}$ transmission). A WTRU may monitor or attempt to decode PDCCH transmission(s) for a reception of RAR or MsgB after the transmission of the second preamble (e.g., instead of after the transmission of the first preamble) and/or after the transmission of the first preamble. In an example, the WTRU may skip PDCCH monitoring for RAN/MsgB after a transmission of the $1^{st}$ preamble if the transmission of the $1^{st}$ preamble is to be succeeded with a $2^{nd}$ preamble or a transmission of the $2^{nd}$ preamble. The WTRU may monitor for or attempt to decode a different RAR or MsgB format if the WTRU has transmitted a super preamble. For example, the different RAR or MsgB format may include an enhanced RAR or MsgB format, where the enhanced RAR or MsgB format may contain the super preamble index or the indices of the first preamble and the second preamble.

A WTRU may stop an RAR or MsgB window (e.g., a configured RAR or MsgB window) and/or consider the reception of a Msg2/B successful if the WTRU receives an RAR corresponding to one or more of: the preamble index of the first transmission, or the preamble index of the second transmission, or the preamble index of the super preamble. For example, the WTRU may start a monitoring window (e.g., an RAR or MsgB window) at the first symbol of the earliest CORESET where the WTRU is configured to receive a PDCCH transmission for the RAR/MsgB reception. The first symbol of the earliest CORESET where the WTRU is configured to receive a PDCCH transmission for the RAR/MsgB reception may be at least one symbol after the last symbol of the last RO used to transmit the super preamble (e.g., the last symbol of the $2^{nd}$ RO herein).

A WTRU may monitor for the RA-RNTI corresponding to the $2^{nd}$ RO, monitor for the RA-RNTI corresponding to the $1^{st}$ RO, monitor for the RA-RNTI corresponding to the RA-RNTI corresponding to both the $2^{nd}$ RO and the $1^{st}$ RO, or monitor for the RA-RNTI corresponding to the $2^{nd}$ RO and the RA-RNTI corresponding to the $1^{st}$ RO. The terms "monitor for" may be used interchangeably with the terms "attempt to decode" in one or more examples herein. The WTRU may be predefined or configured to monitor for the RA-RNTI corresponding to the $2^{nd}$ RO, monitor for the RA-RNTI corresponding to the $1^{st}$ RO, monitor for the RA-RNTI corresponding to the RA-RNTI corresponding to both the $2^{nd}$ RO and the $1^{st}$ RO, or monitor for the RA-RNTI corresponding to the $2^{nd}$ RO and the RA-RNTI corresponding to the $1^{st}$ RO. The WTRU may monitor for a RA-RNTI corresponding to a preamble transmission (e.g., a $1^{st}$ preamble transmission or a $2^{nd}$ preamble transmission) associated with a super preamble and/or a RA-RNTI corresponding to the super preamble or monitor for multiple RA-RNTIs corresponding to respective preamble transmissions associated with the super preamble (e.g., two RA-RNTIs, a first RA-RNTI corresponding to the $1^{st}$ preamble transmission and a second RA-RNTI corresponding to a $2^{nd}$ preamble transmission). The WTRU may monitor for a super preamble RA-RNTI that is computed considering one or more of the allocation of resources in a time domain for a RO (e.g., the first RO or the second RO) of the ROs associated with a super preamble, the allocation of resources in a frequency domain for a RO (e.g., the first RO or the second RO) of the ROs associated with the super preamble, the allocation of resources in a time domain for multiple ROs (e.g., the first RO and the second RO) of the ROs associated with a super preamble, the allocation of resources in a frequency domain for multiple ROs (e.g., the first RO and the second RO) of the ROs associated with the super preamble. In an example, the WTRU may monitor for an RA-RNTI that equals the sum of the RA-RNTI associated with a respective RO of some or all ROs associated with a super preamble (e.g., the sum of the RA-RNTI associated with the $1^{st}$ RO and the RA-RNTI associated with the $2^{nd}$ RO). In some examples, the RA-RNTI associated with a super preamble transmitted over 2 ROs may be computed as the following:

$$RA-RNTI = 1 + \text{s\_id\_}1^{st}RO + 14\times\text{t\_id\_}1^{st}RO + 14\times 80\times\text{f\_id\_}1^{st}RO + \text{s\_id\_}2^{nd}RO + 14\times\text{t\_id\_}2^{nd}RO + 14\times 80\times\text{f\_id\_}1^{nd}RO + 14\times 80\times 8\times\text{ul\_carrier\_id} \quad \text{Equation 1}$$

Equation 1 may be applicable to the RA-RNTI associated with a super preamble transmitted over more than 2 ROs.

A WTRU may monitor for a slot format indication (SFI) index, for example, in the DCI scheduling Msg2/B. The WTRU may receive one or more of the SFI index corresponding to a RO (e.g., the $1^{st}$ RO or the $2^{nd}$ RO associated with a super preamble), the SFI index/indices corresponding to multiple ROs (e.g., the $1^{st}$ RO and the $2^{nd}$ RO associated with a super preamble). If the SFI is signalled as part of the DCI, the WTRU may consider the RAR reception successful, for example, if it corresponds to the SFI of the $1^{st}$ RO, $2^{nd}$ RO, or both ROs. The WTRU may monitor for a different or certain DCI indication depending on whether the WTRU has transmitted one preamble, the WTRU has transmitted more than one (e.g., two) preambles, and/or if the selected RO(s) are associated with different RO(s).

In Msg2/B, there may be a confirmation from the NW that the NW has received multiple transmissions (e.g., the $1^{st}$ transmission and the $2^{nd}$ transmission associated with a super preamble) or a request to transmit or retransmit the missing indication part (e.g., an indication associated with the $1^{st}$ preamble).

In an example, if a WTRU does not receive an RAR or Msg2/B, the WTRU may retransmit both first and second preamble transmissions.

A transmission of a preamble (e.g., a first preamble or a second preamble associated with a super preamble) may or may not be successful. A WTRU may assume that the transmission of msg1 has succeeded, for example, if the WTRU receives an RAR or MsgB with a random access preamble identifier/identification (ID) (RAPID) corresponding to a preamble associated with a super preamble (e.g., the $1^{st}$ preamble or the $2^{nd}$ preamble) or corresponding to the super preamble. A WTRU may transmit a first preamble again or a second preamble of a set of preambles that include the first preamble if an RAR or Msg2/B corresponding to the first preamble has not been received, for example, within an RAR window. For example, the WTRU may retransmit the $2^{nd}$ preamble if the WTRU receives an RAR or MsgB corresponding to the $1^{st}$ preamble (e.g., only to the $1^{st}$ preamble) and/or the WTRU does not receive an RAR to the $2^{nd}$ preamble. The WTRU may transmit a $3^{rd}$ preamble from a subset of the preambles that include the $2^{nd}$ preamble if the WTRU receives an RAR or MsgB corresponding to the $1^{st}$ preamble (e.g., only to the $1^{st}$ preamble) and/or the WTRU does not receive an RAR to the $2^{nd}$ preamble.

A WTRU may fall back to legacy RACH if multiple failures occur, or a time period (e.g., based on a timer) expires. The WTRU may indicate the use case of a feature in the payload of Msg3/A. In an example, the WTRU may indicate a second feature (e.g., a second feature of a feature combination) in a payload of an RAR grant if the WTRU receives an RAR or MsgB corresponding to the $1^{st}$ preamble (e.g., only to the $1^{st}$ preamble) and/or the WTRU does not receive an RAR to the $2^{nd}$ preamble. The $2^{nd}$ preamble may indicate the second feature, for example, if successfully transmitted.

RA-RNTI collisions may be reduced.

WTRUs may use separate ROs with the same RA-RNTI (e.g., with the same slot index and frequency offset). For example, two WTRUs, one legacy WTRU and another WTRU that supports PRACH partitioning/indication may use two separate ROs with the same RA-RNTI. When the number of feature combinations is at a certain value (e.g., a large value), the feature combinations may not be separated on different ROs that have different RA-RNTI values. For example, it may not be possible to separate the feature combinations on different ROs that have different RA-RNTI values in some instances.

An explicit indication may be added in Msg2/MsgB/RAR to differentiate the PDCCH monitoring associated with the WTRU from legacy WTRUs (e.g., to differentiate the PDCCH monitoring for the WTRU from the PDCCH monitoring for the legacy WTRUs). If a WTRU doesn't receive the explicit indication, the WTRU may discard the RAR and/or continue monitoring PDCCH for another Msg2/MsgB//RAR with an RA-RNTI (e.g., the same RA-RNTI) and containing an indication (e.g., the explicit indication).

A WTRU may add an offset to the RA RNTI formula to differentiate the PDCCH monitoring associated with the WTRU from legacy WTRUs (e.g., to differentiate the PDCCH monitoring for the WTRU from the PDCCH monitoring for the legacy WTRUs). The WTRU may scramble the RA-RNTI with another value (e.g., another value that depends on the selected PRACH resource).

Use case indication may be non-RACH based.

Subsequent indication(s) may be used for a feature combination.

A WTRU may indicate support for and/or request use of a feature set via a subsequent indication (e.g., after a preamble and/or an initial transmission). The feature set may include (e.g., consist of) one or a combination of features. Whether a WTRU may indicate a feature set via a subsequent indication may be determined (e.g., restricted) by the NW and/or subject to a configuration, for example, via RRC signalling, or via an explicit indication (e.g., in system information). The full feature set may be indicated (e.g., uniquely indicated) via the subsequent indication, or may be combined with one or more features indicated via other ways (e.g., a preamble transmission, capability signalling, or a device type indication). The subsequent indication configuration may indicate whether the subsequent indication provides the full or partial feature set, and/or how these other features have been indicated (e.g., a preamble transmission and/or a device type indication).

The subsequent indication may include information regarding and/or provide indication(s) of one or more of the following: support for a feature or WTRU capability; a request for the use of a feature, or a request to terminate the use of a feature; whether the list of WTRU features is a full list or a partial list of supported features; whether the subsequent indication is to be combined with another indication and/or what other indication(s) to combine the subsequent indication with (e.g., a preamble transmission); whether the feature is mandatory and/or necessary for an access to the NW (e.g. coverage enhancements); whether the subsequent indication includes a modification to a previous indication (e.g., an addition or a removal of a supported feature).

The supported feature set may be indicated, for example, via a list. A WTRU may include some or all features supported in the subsequent indication, for example, all features supported in the subsequent indication or only those which the WTRU intends to use. The list may indicate (e.g., alternatively indicate) a list of features the WTRU intends to enable or disable. Whether the WTRU desires to enable or disable a feature or feature list may be indicated (e.g., separately from the feature list), for example, via a dedicated information element (IE) or bit. In some examples, the subsequent indication may represent an index value. This index value may point to a specific entry in a table (e.g., a table containing feature set combination(s) and/or a table containing possible feature set combination(s)). In some examples, feature set combination(s) and feature combination(s) may be used interchangeably. The table may be provided via one or more of the following, for example, in system information, via RRC signalling, or via DCI. In some examples, the feature list may be contained as a bitmap, where supported and/or requested features may be classified as '1' and disabled and/or non-supported features may be classified as '0'.

A WTRU may transmit the subsequent indication and/or convey support for and/or request use of feature set information, for example, via one or more of the following: additional bits in RACH preamble(s); a PUSCH transmission (e.g. using Msg3 and/or MsgA payload); a PUCCH transmission (e.g. via UCI); MAC CE; RRC signalling, for example, via capability reporting or a dedicated feature set IE; a device type indication; NAS signalling; a scheduling request (SR).

A WTRU may select which resource, occasion, or method to provide the subsequent indication based on one or more of the following, for example: semi-static configuration (e.g. provided via RRC signalling); a dynamic indication (e.g. upon explicit request from the NW, via DCI, RAR, or system information); the connection state of the WTRU (e.g., a WTRU in a RRC connected state may transmit a subsequent indication, for example, via MAC CE, PUSCH, SR, or RRC signalling; a WTRU in RRC IDLE/INACTIVE may transmit a subsequent indication, for example, via one or more of a dedicated preamble, Msg3 UL grant, RRC message, or msgA PUSCH resource); whether the feature is necessary for RA (e.g., a WTRU requiring coverage enhancements may send at least this feature indication via e.g., a preamble transmission); whether support for the feature impacts a network decision for access control (e.g., the WTRU may select a resource to convey that the WTRU is a RedCap WTRU prior to a completion of an RA procedure to enable the rejection of the WTRU via RRC Reject message(s)); the stage of RA procedure (for example, if the WTRU has received RAR, the WTRU may include a subsequent indication on the Msg3 PUSCH resource, or if the WTRU has received Msg4, the subsequent indication may be included in capability signalling); the amount or number of previous subsequent feature indication transmission attempts; the number of features a WTRU supports; whether the indication is an update to a previous indication.

Based on (e.g., upon) a transmission of a subsequent indication, a WTRU may assume that feature(s) is (de) activated and/or use a feature in the symbol immediately after the final symbol in the subsequent indication transmission, or some offset K after the final symbol in the subsequent indication transmission. In some examples, the WTRU may determine that a feature is active based on a reception of an explicit acknowledgement from the NW (e.g., only assume that a feature is active upon reception of an explicit acknowledgement from the NW). The WTRU may determine an explicit acknowledgment (e.g., assume an explicit acknowledgment), for example, via one or more of the following: HARQ ACK; RAR; Msg4/MsgB; PDCCH transmission(s) with DCI assigned to the WTRU; PDSCH transmission(s); scheduling information; a Bandwidth Part (BWP) switch indication; RRC message(s).

Combinations of features may be indicated. A WTRU may be provided with a set of valid feature combinations from which to indicate a feature set combination. The set of valid feature combinations may be indicated via a table or list with entries including (e.g., consisting of) valid or invalid feature combinations, or via a mapping rule. One or more of the table, the list, or the mapping rule may be signaled to the WTRU via, for example, one or more of the following: system information, RACH configuration, RRC signalling, or DCI. The configuration may also include the applicable bandwidth (e.g., BWP) on which the PRACH resources are valid for the feature or feature combination (e.g., for each feature or each feature combination) and/or whether the resource is on normal UL (NUL), supplementary UL (SUL), or both. For example, one or more of the system information, RACH configuration, RRC signalling, or DCI (or one or more of the table, the list, or the mapping rule) may comprise BWP(s) on which the PRACH resource (s) is valid for the feature(s) or feature combination(s) and/or may indicate whether the resource is on NUL, SUL, or both.

Based on (e.g., upon) a transmission of an invalid set of feature combinations, one or more of the following may occur: the WTRU may be rejected from accessing the NW (e.g., via an RRC Reject message(s)), retransmit a feature set with a valid combination, fall back to 4-step RACH, retransmit a preamble combination, and/or perform RA.

In some examples, a WTRU may group features in terms of what stage they are used (e.g., required) in the connection set-up process. For example, a WTRU may group features necessary to perform RA (e.g., coverage enhancements, RedCap).

The WTRU may not have a valid PRACH resource to indicate the feature combination for which RA was initiated. If the WTRU does not have a valid PRACH resource to indicate the feature combination for which RA was initiated, the WTRU may perform one or more of the following: the WTRU may multiplex in the payload of Msg3 or MsgA the feature or feature combination for which RACH was initiated; the WTRU may select a PRACH resource configured for a feature that is part of the desired feature combination, for example, even if it is combined with another undesired feature; the WTRU may select a PRACH resource configured for an indication of a subset of the features from the feature combination that RA was triggered for; the WTRU may trigger a SR, for example, on an SR configuration associated with the feature(s) to indicate, after the RA is successfully completed; the WTRU may transmit an indication on PUCCH associated with the feature(s) to indicate (e.g., after the RA is successfully completed); the WTRU may switch its active UL and/or DL BWP to another BWP on which the PRACH resource(s) to indicate the feature or feature combination is configured.

A WTRU may select a PRACH resource configured for indication of a subset of the features from the feature combination RA was triggered for. The WTRU may be configured or predefined with some prioritization rule(s) to determine which PRACH resource to select when RA is initiated for a feature combination, for example, while the available PRACH resources (e.g., each of the available PRACH resources) in the active BWP is configured for a subset of features from that feature combination. For example, the WTRU may be configured with PRACH resources for feature A, feature B, and feature C, and RA may be initiated to indicate the combination of feature A and feature B; the WTRU may select the PRACH resources for feature B if feature B is prioritized over feature A. As an example, if an RA is initiated for SDT and Redcap indication, the WTRU may prioritize the selection of PRACH resources configured for SDT. If an RA is initiated for CovEnh (e.g., Msg3 or Msg1 repetition) and Redcap indication, the WTRU may prioritize the selection of PRACH resources configured for CovEnh. If an RA is initiated for SDT and CovEnh indication, the WTRU may prioritize the selection of PRACH resources configured for SDT. An example of prioritization (e.g., prioritization rule) between features may be: priority of small data>priority of slicing>priority of reduced capability>priority of coverage enhancement. An example of prioritization (e.g., prioritization rule) between features may be: priority of small data>priority of reduced capability>priority of slicing>priority of coverage enhancement.

A WTRU may switch to a different PRACH resource associated with a different feature within the feature combination for which RA was initiated for, for example, after a number of retransmissions (or transmissions) or after an elapsed time (e.g., a timer expiry since the initial preamble transmission).

A WTRU may include a subsequent indication to indicate the feature missing from the preamble indication, for example, if the WTRU selects a PRACH resource configured for indication of a subset of the features from the feature combination that RA was triggered for. For example, the WTRU may select the PRACH resource associated with Redcap, but later indicate the high priority slice or the slice index in a subsequent transmission (e.g., on PUSCH, another PRACH, or on PUCCH).

A WTRU may consider a subset of feature combinations valid, for example, depending on the active BWP. The WTRU may be configured with PRACH resource(s) for a feature combination on a subset of BWP(s), and, for example, may consider the feature combination valid for the BWP(s) (e.g., only for the subset of BWPs).

A WTRU may switch BWP(s). For example, a WTRU may switch its active BWP (e.g., UL BWP(s) and/or DL BWP(s) to the initial BWP or the BWP (e.g., indicated by a BWP index) on which the feature combination is considered valid (or configured) upon RA initiation, for example, based on or more of the following: if the active BWP (e.g., the active UL BWP) does not contain valid PRACH resource(s) to perform RACH indication (e.g., RACH indication of the feature(s) that initiated RACH); if the initial BWP is configured with PRACH resource(s) partitioned for the feature combination (or a subset thereof) for which RA was triggered.

A WTRU may indicate a feature or a feature combination in RA procedure(s) initiated in a subset of modes (e.g., in IDLE, INACTIVE, and/or connected state). In a connected state, the WTRU may use PRACH resources associated with the feature or feature combination for a certain type or any type of RA (e.g., RA triggered by timing alignment timer (TAT) expiry or RA triggered by scheduling request(s) (RA-SR) or beam failure recovery (BFR)). In some examples, the WTRU may exclude (or not select) PRACH resource(s) associated with a first feature or a first feature combination for RA procedures triggered in a connected mode (e.g., RA triggered by TAT expiry or RA-SR or BFR). The WTRU may use PRACH resource(s) associated with a second feature or feature combination. In a connected state, the WTRU may use PRACH resource(s) associated with the feature or feature combination, for example, if valid or available in the active BWP, for RA-SR procedure(s) initiated by an SR triggered by data arrival from one or more of a data radio bearer (DRB), a logical channel (LCH), or a logical channel group (LCG) associated with the feature or feature combination. The WTRU may (e.g., if there are no PRACH resources valid for the feature or feature combination in the active BWP in a connected state) select a valid PRACH resource or any valid PRACH resource for the transmission(s) associated with the RA-SR procedure.

In an INACTIVE state, for example, if the RA is initiated to indicate a feature combination that contains SDT, a WTRU may multiplex in the small data payload the indication of other feature(s) that are not explicitly configured for PRACH indication in the RA-SDT resource(s) (e.g., one or more of the following: an indication in the payload of coverage enhancement, a high priority slice, a slice index, or a reduced capability indication).

In some configurations, a WTRU may have PRACH partitions for some features or feature combinations on 2-step RA resources only, on 4-step RA resources only, or both. The WTRU may select the RA type (e.g., 2-step or 4-step RA), for example, based on the feature or feature combination to indicate. For example, the WTRU may select 4-step RA to indicate a feature combination (e.g., even if RSRP is above the RA type selection threshold or without comparing the measured RSRP to the threshold configured for 2-step RA type selection) if PRACH resource(s) to indicate the feature or feature combination is not configured for 2-step RA on the active BWP. In some examples, the WTRU may select 2-step RA to indicate a feature combination (e.g., even if RSRP is less than the RA type selection threshold or without comparing the measured RSRP to the threshold configured for 2-step RA type selection) if PRACH resource(s) to indicate the feature or feature combination is not configured for 4-step RA on the active BWP. The WTRU may change RA type for a preamble retransmission or transmission, for example, after a number of retransmissions (or an elapsed time). In an example, the WTRU may fall back to 4-step RA.

In some configurations, for example, a WTRU may have PRACH partitions for some features or feature combinations on Group A preambles only, on Group B preambles only, or both. The WTRU may select the preamble group (e.g., Group A or Group B), for example, depending on whether the feature or feature combination to indicate is configured. For example, the WTRU may use Group A to indicate a feature combination, even when one or more of the conditions (e.g., legacy conditions) for the selection of Group B are satisfied (e.g., if pathloss is above the Group B threshold and/or the desired TBS is larger than the threshold), if PRACH resource(s) to indicate the feature or feature combination is not configured for Group B preambles. The WTRU may use Group B to indicate a feature combination, even when one or more of the conditions (e.g., legacy conditions), for selection of Group A are satisfied (e.g., if pathloss is above the Group B threshold and/or the desired TBS is smaller than the threshold), if PRACH resources to indicate the feature or feature combination is not configured for Group A preambles. The WTRU may change preamble groups for a preamble retransmission, for example, after a number of retransmissions or transmissions (or an elapsed time).

Figure 5:
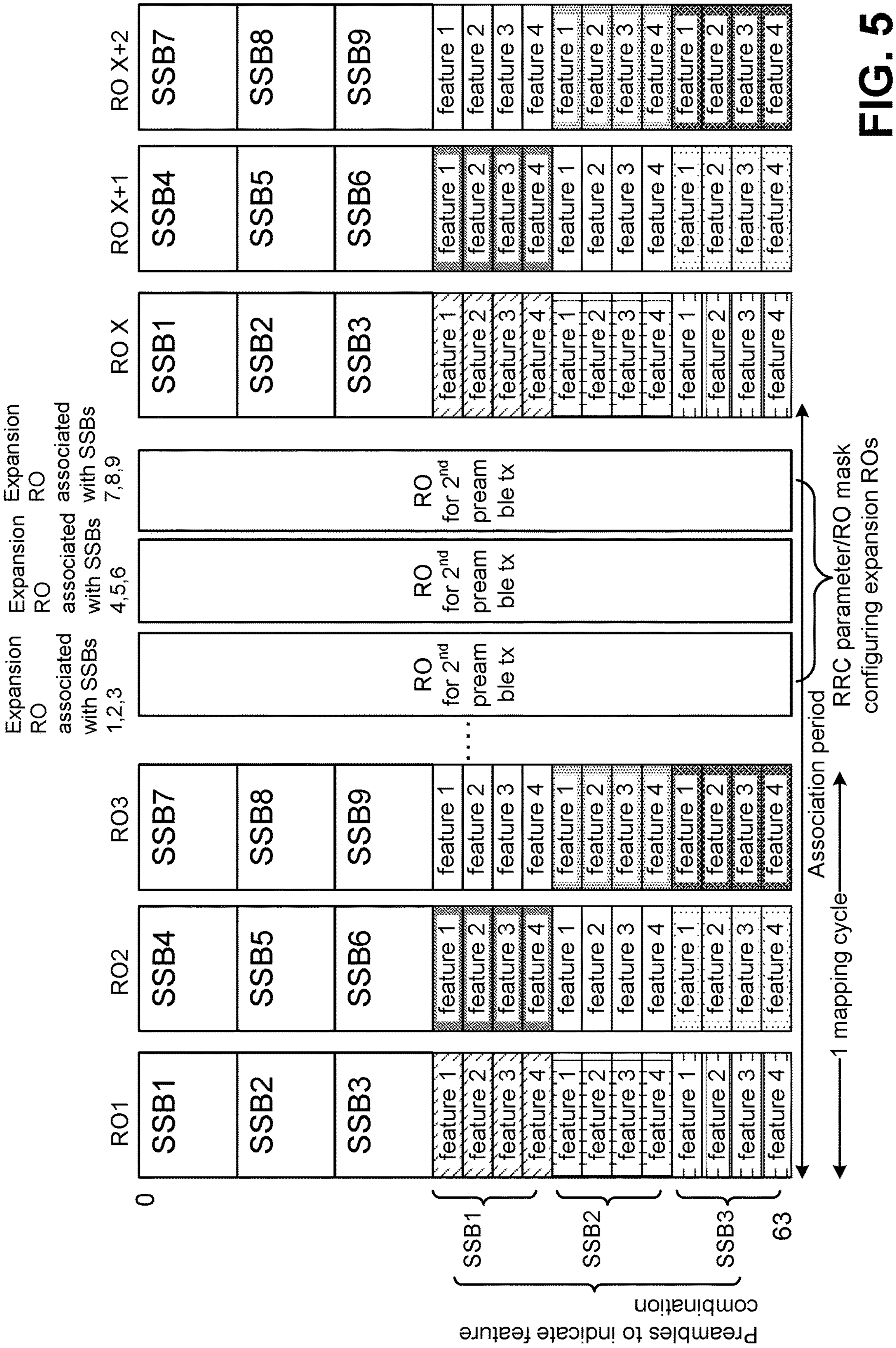
FIG. 5 illustrates an example of allocation of expansion RA occasions in a time domain in a multi-SSB cell.

The following may be an example of allocation of expansion RA occasions in a time domain in a multi-SSB cell. FIG. 5 illustrates an example of allocation of expansion RA occasions in a time domain in a multi-SSB cell. An example of an association (e.g., a predefined association) between the timing of the second RO of a super preamble and the timing of the first RO, which is configured per set of SSBs, is illustrated in FIG. 5. A WTRU may be configured with expansion ROs, for example, for the purpose of the transmission of the $2^{nd}$ preamble within the association period associated with an SSB burst. For a legacy RO configured with an association for a subset of SSBs, the WTRU may be configured with an associated $2^{nd}$ expansion RO before the next association period in which the same subset of SSBs is mapped. This is illustrated in one or more figures herein (e.g., FIG. 5). The WTRU may be configured by RRC or broadcast signalling with an RO mask associated with which ROs are expansion ROs for the $2^{nd}$ transmission, and which subset of SSBs is associated with an expansion RO (e.g., each expansion RO). Expansion ROs may be assumed (e.g., by the WTRU) to be after an integer number of association periods and/or SSB mapping cycles. The expansion ROs may be configured to be frequency multiplexed in the same mapping cycle for a subset of SSBs multiplexed in the same first RO. For example, the $1^{st}$ and $2^{nd}$ RO may be in the same time slot, or slots in which the SSBs are applicable/broadcasted, possibly with a configured or predefined time gap between the two ROs to allow for a separation in the transmission power domain. The WTRU may be configured with an association between multiple ROs (e.g., two ROs), for example, in a similar way to the association configured between PRACH and PUSCH occasions in type 2 RA procedures.

The following may be an example of analysis of PRACH overhead between PRACH partitioning using a single preamble transmission and/or multiple transmissions. A WTRU may indicate one of 642 unique indications (e.g., with two ROs each with 64 available preambles) if the two preamble transmissions may be linked to the same WTRU.

It may be assumed that multiple ROs (e.g., 2 ROs) are associated (e.g., using a linkage similar to the one defined in 2-step RA for PRACH and PUSCH occasions). A WTRU may transmit multiple (e.g., two) preamble transmissions to indicate a feature combination. For example, a $1^{st}$ preamble transmission may indicate the feature combination, SSB, and msg3 Group A vs. B; while a $2^{nd}$ preamble transmission may be used for randomization between WTRUs selecting the same feature combination, e.g., to reduce the preamble collision probability. This is illustrated in one or more figures herein (e.g., FIG. 3). In some examples, the NW may configure the $1^{st}$ preamble transmission such that the $1^{st}$ preamble transmission may correspond to an intersection of a number of features, and/or the $2^{nd}$ preamble distinguishes which of these features.

A PRACH capacity gain may be achieved. For example, at the simplest minimum, the PRACH capacity gain may come from the fact that the feature combination partitioning in the $2^{nd}$ RO does not need to be repeated per SSB and per msg3 Group set, as a spatial separation between WTRUs is exploited.

If multiple (e.g., two) WTRUs simultaneously select the same SSB and the same feature combination in the $1^{st}$ RO (e.g., a preamble collision in the $1^{st}$ RO), the WTRUs may be distinguished or separated by the $2^{nd}$ preamble transmission if the WTRU randomly selects different preamble indices in the $2^{nd}$ RO. If multiple (e.g., two) WTRUs simultaneously select the same SSB but different feature combinations, the WTRUs may be distinguished or separated by the $2^{nd}$ preamble transmission by feature partitioning in the $2^{nd}$ RO in the preamble index domain. If multiple (e.g., two) WTRUs select different SSBs but the same feature combination in the $1^{st}$ RO, the WTRUs (e.g., two WTRUs) may further randomize their preamble selection in the $2^{nd}$ RO and the NW may address the WTRUs (e.g., both WTRUs) by sending multiple (e.g., two) RARs if the WTRUs (e.g., the two WTRUs) select different preambles in the $2^{nd}$ RO. A WTRU may consider msg1 transmission successful if the WTRU receives an RAR with a RAPID corresponding to the first or the second preamble index, for example, as per the usual RA procedure.

Taking an example where a (e.g., each) feature combination is allocated a single preamble per SSB in the $1^{st}$ RO and P preambles in the $2^{nd}$ RO, the PRACH overhead associated with feature indication by two preamble transmissions may be estimated as: Number of preambles2-preamble tx (e.g., number of required new preambles2-preamble tx)$=2\times N\times 2^K+P\times 2^K$. Taking an example of where N=6 SSBs; K=4 features (SDT, RedCap, slicing, and Coverage); P=8 preambles: the number (e.g., the required number) of preambles using ad-hoc approach: 1536 (24 ROs), while the number (e.g., the required number) of preambles using 2-preamble tx approach: 320 (5 ROs), thus corresponding to a PRACH overhead reduction of 79%.

One potential benefit in addition to indicating the feature is to increase the coverage and reliability of msg1 by transmitting multiple (e.g., 2) preambles. In examples, an NW (e.g., the gNB receiver) may combine both transmissions to increase coverage of msg1, for example, as long as they are from the same root sequence and the gNB did not detect a preamble collision (e.g., and even if the selected preambles are of different indices). For example, when a WTRU is in a bad coverage, the NW may not detect the $1^{st}$ preamble correctly on its own, but may combine the $1^{st}$ preamble with the reception of the $2^{nd}$ preamble for a better estimation and/or detection.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU), comprising:

a processor configured to:

receive radio resource control (RRC) configuration information that indicates a first set of physical random access channel (PRACH) resources associated with a first feature combination and a second set of PRACH resources associated with a second feature combination;

determine that a third feature combination is applicable to a PRACH transmission;

determine a configured feature priority associated with a first feature of the third feature combination, wherein the third feature combination includes a plurality of features, and the first feature has a highest configured feature priority among the plurality of features;

determine to use one of the first or second set of PRACH resources for the PRACH transmission based on the configured feature priority associated with the first feature; and send the PRACH transmission using the determined first or second set of PRACH resources;

wherein the plurality of features comprises small data transmission (SDT), slicing, redcap, and coverage enhancement;

wherein the first feature is SDT;

wherein a configured feature priority associated with SDT is higher than a configured feature priority associated with slicing and higher than a configured feature priority associated with redcap; and wherein the configured feature priority associated with slicing and the configured feature priority associated with redcap are higher than a configured feature priority associated with coverage enhancement.

2. The WTRU of claim 1, wherein the determination to use one of the first or second set of PRACH resources for the PRACH transmission is further based on the first feature being in the first or second feature combination.

3. The WTRU of claim 1, wherein the processor is further configured to determine that the first feature is in the first feature combination, wherein, based on the configured feature priority associated with the first feature and the determination that the first feature is in the first feature combination, the first set of PRACH resources is determined to be used for the PRACH transmission, and the PRACH transmission is sent using the first set of PRACH resources.

4. The WTRU of claim 3, wherein the first set of PRACH resources indicates a preamble and a random access channel (RACH) occasion associated with the preamble.

5. The WTRU of claim 1, wherein the third feature combination is different from the first feature combination and the second feature combination, wherein the first feature is in the first feature combination and not in the second feature combination, and wherein the first set of PRACH resources is determined to be used for the PRACH transmission.

6. The WTRU of claim 1, wherein the processor is further configured to determine that the third feature combination is used to initiate a random access procedure that comprises sending the PRACH transmission, and wherein the determination that the third feature combination is applicable to the PRACH transmission is based on the determination that the third feature combination is used to initiate the random access procedure.

7. The WTRU of claim 1, wherein the first feature corresponds to a capability of the WTRU, and wherein the capability of the WTRU is one of: redcap; small data transmission (SDT); coverage enhancement or Msg3 repetition; or slicing.

8. The WTRU of claim 1, wherein the processor is further configured to receive radio resource control (RRC) configuration information, and wherein the configured feature priority associated with the first feature is determined based on the RRC configuration information.

9. The WTRU of claim 8, wherein RRC configuration information indicates a respective configured feature priority for each feature of the plurality of features.

10. The WTRU of claim 1, wherein the processor is further configured to receive system information, wherein the system information indicates a respective configured feature priority for each feature of the plurality of features, and wherein the configured feature priority associated with the first feature is determined based on the system information.

11. A method performed by a wireless transmit/receive unit (WTRU), comprising:

receiving radio resource control (RRC) configuration information that indicates a first set of physical random access channel (PRACH) resources associated with a first feature combination and a second set of PRACH resources associated with a second feature combination;

determining that a third feature combination is applicable to a PRACH transmission;

determining a configured feature priority associated with a first feature of the third feature combination, wherein the third feature combination includes a plurality of features, and the first feature has a highest configured feature priority among the plurality of features;

determining to use one of the first or second set of PRACH resources for the PRACH transmission based on the configured feature priority associated with the first feature; and sending the PRACH transmission using the determined first or second set of PRACH resources;

wherein the plurality of features comprises small data transmission (SDT), slicing, redcap, and coverage enhancement;

wherein the first feature is SDT;

wherein a configured feature priority associated with SDT is higher than a configured feature priority associated with slicing and higher than a configured feature priority associated with redcap; and wherein the configured feature priority associated with slicing and the configured feature priority associated with redcap are higher than a configured feature priority associated with coverage enhancement.

12. The method of claim 11, wherein the determination to use one of the first or second set of PRACH resources for the PRACH transmission is further based on the first feature being in the first or second feature combination.

13. The method of claim 11, further comprising determining that the first feature is in the first feature combination, wherein, based on the configured feature priority associated with the first feature and the determination that the first feature is in the first feature combination, the first set of PRACH resources is determined to be used for the PRACH transmission, and the PRACH transmission is sent using the first set of PRACH resources.

14. The method of claim 13, wherein the first set of PRACH resources indicates a preamble and a random access channel (RACH) occasion associated with the preamble.

15. The method of claim 11, wherein the third feature combination is different from the first feature combination and the second feature combination, wherein the first feature is in the first feature combination and not in the second feature combination, and wherein the first set of PRACH resources is determined to be used for the PRACH transmission.

16. The method of claim 11, further comprising determining that the third feature combination is used to initiate a random access procedure that comprises sending the PRACH transmission, and wherein the determination that the third feature combination is applicable to the PRACH transmission is based on the determination that the third feature combination is used to initiate the random access procedure.

17. The method of claim 11, wherein the first feature corresponds to a capability of the WTRU, and wherein the capability of the WTRU is one of: redcap RedCap; small data transmission (SDT); coverage enhancement or Msg3 repetition; or slicing.

18. The method of claim 11, further comprising receiving radio resource control (RRC) configuration information, and wherein the configured feature priority associated with the first feature is determined based on the RRC configuration information.

19. The method of claim 18, wherein RRC configuration information indicates a respective configured feature priority for each feature of the plurality of features.

20. The method of claim 11, further comprising receiving system information, wherein the system information indicates a respective configured feature priority for each feature of the plurality of features, and wherein the configured feature priority associated with the first feature is determined based on the system information.

* * * * *